(12) United States Patent
Murphy et al.

(10) Patent No.: US 11,983,467 B2
(45) Date of Patent: May 14, 2024

(54) RAPID AERO MODELING FOR COMPUTATIONAL EXPERIMENTS (RAM-C)

(71) Applicant: UNITED STATES OF AMERICA AS REPRESENTED BY THE ADMINISTRATOR OF NASA, Washington, DC (US)

(72) Inventors: Patrick C. Murphy, Suffolk, VA (US); Pieter G. Buning, Yorktown, VA (US); Benjamin M. Simmons, Yorktown, VA (US)

(73) Assignee: UNITED STATES OF AMERICA AS REPRESENTED BY THE ADMINISTRATOR OF NASA

( * ) Notice: Subject to any disclaimer, the term of this patent is extended or adjusted under 35 U.S.C. 154(b) by 429 days.

(21) Appl. No.: 17/144,995

(22) Filed: Jan. 8, 2021

(65) Prior Publication Data
US 2022/0121786 A1  Apr. 21, 2022

Related U.S. Application Data

(60) Provisional application No. 63/116,422, filed on Nov. 20, 2020, provisional application No. 62/972,674, filed on Feb. 11, 2020.

(51) Int. Cl.
G06F 30/15 (2020.01)

(52) U.S. Cl.
CPC .................. *G06F 30/15* (2020.01)

(58) Field of Classification Search
CPC .......... G06F 30/20; G06F 30/15; G06F 30/28; G06F 2119/14; G06F 2113/08; Y02T 90/00
See application file for complete search history.

(56) References Cited

U.S. PATENT DOCUMENTS

| | | | |
|---|---|---|---|
| 6,216,063 B1 * | 4/2001 | Lind | B64F 5/60 701/4 |
| 11,030,360 B2 * | 6/2021 | Sato | G06F 30/15 |
| 2018/0268090 A1 * | 9/2018 | Ren | G05B 23/0297 |
| 2020/0117842 A1 * | 4/2020 | Patankar | G06F 30/15 |

OTHER PUBLICATIONS

Booze, et al., "Final Report Urban Air Mobility (UAM) Market Study," Nov. 21, 2018, pp. 1-160, McLean, Virginia.
(Continued)

*Primary Examiner* — Kibrom K Gebresilassie
(74) *Attorney, Agent, or Firm* — M. Bruce Harper; Robin W. Edwards; Trenton J. Roche

(57) ABSTRACT

A Rapid Aero Modeling program and process may be applied to computational experiments such as computational fluid dynamics (CFD) programs to obtain aerodynamic models which may be in the form of polynomial equations. The program and process may be utilized to estimate (develop) aerodynamic models appropriate for flight dynamics studies, simulations, and the like. Feedback loops are provided around computational codes to rapidly guide testing toward aerodynamic models that meet user-defined fidelity criteria. A user has the freedom to choose a specific level of fidelity in terms of prediction error, in advance of a CFD test (computation).

20 Claims, 31 Drawing Sheets
(21 of 31 Drawing Sheet(s) Filed in Color)

(56) References Cited

OTHER PUBLICATIONS

McKinsey, et al., "Urban Air Mobility (UAM) Market Study," Nov. 2018, pp. 1-56.
Button, K., "For Vahana, A Study in Coping with Complexity," Aerospace America, Jun. 2019, pp. 1-15.
Deloach, R., "Applications of Modern Experiment Design to Wind Tunnel Testing at NASA Langley Research Center," AIAA 98-0713, 36th AIAA Aerospace Sciences Meeting and Exhibit, Reno, NV, 1998, pp. 1-14, Hampton, VA.
Morelli, E.A. et al., "Wind Tunnel Database Development Using Modern Experiment Design and Multivariate Orthogonal Functions," AIAA 2003-0653, 41st AIAA Aerospace Sciences Meeting & Exhibit, pp. 1-18, Reno, NV, 2003.
Landman, D. et al., "Response Surface Methods for Efficient Complex Aircraft Configuration Aerodynamic Characterization," Journal of Aircraft, Jul.-Aug. 2007, pp. 1190-1196, vol. 44, No. 4.
Landman, D. et al., "Hybrid Design for Aircraft Wind-Tunnel Testing Using Response Surface Methodologies," Journal of Aircraft, Jul.-Aug. 2007, pp. 1214-1221, vol. 44, No. 4.
Landman, D. et al., "Efficient Methods for Complex Aircraft Configuration Aerodynamic Characterization Using Response Surface Methodologies," 44th Aerospace Sciences Meeting and Exhibit, Jan. 2006, pp. 1-12.
Rothhaar, P. et al., "NASA Langley Distributed Propulsion VTOL Till Wing Aircraft Testing, Modeling, Simulation, Control, and Flight Test Development," AIAA AFM Conference, AIAA Aviation 2014, pp. 1-14, ALAA Paper No. 2014-2999.
Busan, R. et al., "Enabling Advanced Wind-Tunnel Research Methods Using the NASA Langley 12-Foot Low Speed Tunnel," AIAA Aviation and Aeronautics Forum and Exposition 2014, pp. 1-22, AIAA Paper No. 2014-3000.
Murphy P. et al., "Experiment Design for Complex VTOL Aircraft with Distributed Propulsion and Tilt Wing," AIAA Atmospheric Flight Mechanics Conference, AIAA SciTech 2015, pp. 1-26, AIAA Paper No. 2015-0017.
Murphy, P. et al., "Efficient Testing Combining Design of Experiment and Learn-to-Fly Strategies," AIAA SciTech Forum, Atmospheric Flight Mechanics Conference, Jan. 2017, pp. 1-22, Paper AIAA 2017-0696.
Simpson, J. R. et al., "Streamlining Flight Test with the Design and Analysis of Experiments," Journal of Aircraft, Nov.-Dec. 2001, pp. 1110-1116. vol. 38, No. 6.
Omran, A. et al., "Global Stability and Control Derivative Modeling Using Design of Experiments," AIAA Flight Mechanics Conference, 2009, pp. 1-32, AIAA Paper No. 2009-5721.
Brandon, J. M. et al., "Nonlinear Aerodynamic Modeling From Flight Data Using Advanced Piloted Maneuvers and Fuzzy Logic," Oct. 2012, pp. 1-25, Hampton, VA.
Morelli, E. A., "Efficient Global Aerodynamic Modeling from Flight Data," 50th AIAA Aerospace Sciences Meeting, Jan. 2012, pp. 1-26, AIAA Paper 2012-1050.
Brandon, J. M. et al., "Real-Time Global Nonlinear Aerodynamic Modeling from Flight Data," Journal of Aircraft, Sep.-Oct. 2016, pp. 1261-1297, vol. 53, No. 5.
North, D. D., "Flight Testing of a Scale Urban Air Mobility Technology Testbed," AIAA SciTech 2021 Forum, Virtual Event, 2021, pp. 1-10.
Williams, B. Y. et al., "The Effect of Systematic Error in Forced Oscillation Testing," Aerospace Sciences Meeting, 2012, pp. 1-20, AIAA Paper No. 2012-0768.
Cummings, R. M. et al., "Integrated Computational/Experimental Approach to Unmanned Combat Air Vehicle Stability and Control Estimation," Journal of Aircraft, 2012, pp. 1542-1557, vol. 49, No. 6.
Ghoreyshi, M. et al., "Unsteady Aerodynamics Modeling for Aircraft Maneuvers: a New Approach Using Time-Dependent Surrogate Modeling," 30th ALAA Applied Aerodynamics Conference, Jun. 2012, pp. 1-25, AIAA 2012-3327.

Murphy, P. C. et al., "System Identification Applied to Dynamic CFD Simulation and Wind-Tunnel Data," AJAA Atmospheric Flight Mechanics Conference, Aug. 2011, pp. 1-15, AIAA 2011-6522.
Murphy, P. C. et al., "Nonlinear Unsteady Aerodynamic Modeling Using Wind Tunnel and Computational Data," Journal of Aircraft, Mar.-Apr. 2017, pp. 659-683, vol. 54, No. 2.
Frink, N. T. et al., "Computational Aerodynamic Modeling Tools for Aircraft Loss-of-Control," Journal of Guidance, Control, and Dynamics, Apr. 2017, pp. 789-803, vol. 40, No. 4.
Derlaga, J. M. et al., "Recent Progress in OVERFLOW Convergence Improvements," Jan. 2020, pp. 1-18, AIAA Paper 2020-1045.
Buning, P. G., et al., "Near-Body Grid Adaption for Overset Grids," Jun. 2016, pp. 1-14, AIAA Paper 2016-3326.
Buning, P. G et al., "CFD Approaches for Simulation of Wing-Body Stage Separation," Aug. 2004, pp. 1-13, AIAA-2004-4838.
Geuther, S. C. et al., "LA-8 Computational Analysis and Validation Studies Using FlightStream," AIAA SciTech 2021 Forum, Jan. 19-21, 2021, pp. 1-11.
North, D. D. et al., "Design and Fabrication of the LA-8 Distributed Electric Propulsion VTOL Testbed," AIAA SciTech Forum, Jan. 19-21, 2021 , pp. 1-19.
Busan, R. C. et al., "Wind Tunnel Testing Techniques for a Tandem Tilt-Wing, Distributed Electric Propulsion VTOL Aircraft," AIAA SciTech Forum, Jan. 2021, pp. 1-24.
Simmons, B. M. et al., "Wind Tunnel-Based Aerodynamic Model Identification for a Tilt-Wing, Distributed Electric Propulsion Aircraft," AIAA SciTech 2021 Forum, Jan. 2021, pp. 1-27.
Simmons, B. M., "System Identification for Propellers at High Incidence Angles," AIAA SciTech Forum, Jan. 19-21, 2021 pp. 1-24.
Murphy, P. C. et al., "Preliminary Steps in Developing Rapid Aero Modeling Technology," AIAA Atmospheric Flight Mechanics Conference, AIAA SciTech , Jan. 6-10, 2020 Forum, pp. 1-21, AIAA Paper No. 2020-0764.
Murphy, P. C. et al., "Rapid Aero Modeling for Urban Air Mobility Aircraft in Wind-Tunnel Tests," AIAA SciTech 2021 Forum, Jan. 2021, pp. 1-21.
Flemming, R. J., "An Experimental Evaluation of Advanced Rotorcraft Airfoils in the NASA Ames Eleven-Foot Transonic Wind Tunnel," NASA Contractor Report 166587, Sep. 1984, pp. 1-168.
Silva, C. et al., "VTOL Urban Air Mobility Concept Vehicles for Technology Development," 2018 Aviation Technology, Integration, and Operations Conference, AIAA Aviation Forum, Jun. 25-29, 2018, pp. 1-18.
Johnson, W. R., "NDARC NASA Design and Analysis of Rotorcraft ," 2015, pp. 1-260, NASA/TP-2015-218751.
Weinstein, R. et al., "Global Aerodynamic Modeling using Automated Local Model Networks in Real Time," ALAA Atmospheric Flight Mechanics Conference, AIAA SciTech Forum, Jan. 2020, pp. 1-32, AIAA Paper 2020-0762.
Chaffin, et al., "Helicopter Fuselage Aerodynamics Under a Rotor by Navier-Stokes Simulation," Journal of the American Helicopter Society, 1997, pp. 235-243, vol. 42, No. 3.
Box, G. E. P. et al., "On the experimental attainment of optimum conditions," J. Roy. Statist. Soc., Ser. B Metho., 1951, pp. 1-45, vol. 13, No. 1.
Design Expert software, version 12, by Stat-Ease, www.statease.com, accessed Jun. 20, 2023.
JMP software, version 14, by SAS Institute, www.jmp.com, accessed Mar. 9, 2021.
Geuther, S. C. et al., "Investigation of a Tandem Tilt-wing VTOL Aircraft in the NASA Langley 12-Foot Low-Speed Tunnel," NASA TM-2020-5003178, 2020.
Murphy, P. C. et al., "Rapid Aero Modeling for Urban Air Mobility Aircraft in Computational Experiments," AIAA SciTech 2021 Forum, Jan. 2021, pp. 1-21.
Deloach, R., "Assessment of Response Surface Models Using Independent Confirmation Point Analysis," 48th AIAA Aerospace Sciences Meeting and Exhibit, 2010, pp. 1-22, AIAA 2010-741.
Ventura Diaz, P. et al., "High-Fidelity Computational Aerodynamics of Multi-Rotor Unmanned Aerial Vehicles," Jan. 2018, pp. 1-22, AIAA Paper 2018-1266.

(56) References Cited

OTHER PUBLICATIONS

Jia, Z. et al., "Acoustic Analysis of a Quadrotor eVTOL Design via High Fidelity Simulations," May 2019, pp. 1-24, AIAA Paper 2019-2613.

Sandoz, B. et al., "Longitudinal Aerodynamic Characteristics of a V/STOL Tilt-wing Four-propeller Transport Model using a Surface Vorticity Flow Solver," 2018 AIAA Aerospace Sciences Meeting, 2018, pp. 1-19.

* cited by examiner

RAPID AERO MODELING FOR COMPUTATIONAL EXPERIMENTS (RAM-C)

CROSS-REFERENCE TO RELATED PATENT APPLICATION

This patent application claims the benefit of and priority to U.S. Provisional Patent Application No. 62/972,674, filed on Feb. 11, 2020, entitled "RAPID AERO MODELING FOR COMPUTATIONAL EXPERIMENTS (RAM-C)," and U.S. Provisional Patent Application No. 63/116,422, filed on Nov. 20, 2020, entitled "RAPID AERO MODELING FOR COMPUTATIONAL EXPERIMENTS (RAM-C)," the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Aerodynamic models may be utilized for various applications. For example, aerodynamic models may be utilized for non-linear flight dynamics and control simulations. In general, aerodynamic models utilized for these applications require determining forces acting on the model under various flight conditions. Computation fluid dynamics (CFD) programs may be utilized to generate forces for a specific flight condition. However, during simulations, the flight conditions may change rapidly, such that a CFD program cannot determine the aerodynamic forces quickly enough for the simulation. Thus, aerodynamic models in the form of polynomial equations may be estimated from wind tunnel test measurements and/or CFD simulated tests, and these polynomial models can predict aerodynamic forces and moments rapidly, making simulation studies practical and real-time simulation possible. However, the accuracy of the predictions may not be known.

Traditional testing and modeling methods may lead to increase computational costs and missed key factor interactions, especially for more complex aircraft having aerodynamic nonlinearities. Examples of such vehicles include Electric Vertical Takeoff and Landing (eVTOL) aircraft and Urban Air Mobility (UAM) transportation systems.

BRIEF SUMMARY OF THE INVENTION

The present disclosure relates to a Rapid Aero Modeling (RAM) program and process that may be applied to computational experiments such as computational fluid dynamics (CFD) programs to efficiently and automatically obtain aerodynamic models during computational investigations. This approach may generally be referred to as RAM-C. RAM-C according to one aspect of the present disclosure is designed to estimate aerodynamic models appropriate for flight dynamics studies, development of control systems, simulations, and the like. RAM-C provides feedback loops around computational codes to rapidly guide testing toward aerodynamic models that meet user-defined fidelity (acceptable error) criteria. RAM-C allows a user the freedom to choose, in advance of the test (i.e., in advance of a CFD computation), a specific level of fidelity in terms of prediction error. RAM-C preferably only collects enough data required to meet user-specified prediction error requirements.

One aspect of the present disclosure is a method of creating an aerodynamic model that predicts forces on an aerodynamic body due to movement of air around the aerodynamic body, whereby the aerodynamic model can be used for flight dynamics simulations or other applications. The method includes determining required fidelity criteria for each aerodynamic model in pursuit of a user-specified fidelity requirement, wherein the required fidelity criteria comprise a plurality of maximum allowable prediction errors. The method further includes utilizing selected factors that vary during the flight to form a series of data test blocks, wherein at least some of the factors comprise ranges that are capable of being split. The series of data test blocks comprise models having increasing order whereby the increasing order provides increased accuracy to account for possible interactions between the selected factors. Selected factors that vary during flight are also utilized to form validation data. The method further includes: a) from a library of data test blocks using the first in a sequence of data blocks to generate input data for a computational fluid dynamics (CFD) program (or wind tunnel test); b) applying the input data to a CFD program (or tunnel test) to produce CFD output data (or tunnel output data) in terms of aerodynamic forces and moments that allows RAM to estimate aerodynamic polynomial models; and c) utilizing predefined prediction error criteria, the validation data, and the CFD output data to determine that the RAM estimated aerodynamic models satisfy pass-fail validation criteria. If the RAM aerodynamic models do not satisfy the pass-fail criteria, steps a)-c) may be repeated utilizing data test blocks of increasing order from the block library allowing estimation of aerodynamic models of increasing order. If the aerodynamic model does not satisfy the pass-fail criteria after the sequence of data blocks, one or more of the factors may be split to modify a test region and allow the process to continue over a smaller region.

A first test data block may, optionally, comprise a face-centered central composite design in two-factor space, and a second test data block may, optionally, comprise a nested face-center design in two-factor space. A third test data block may, optionally, comprise an I-optimal configuration that minimizes prediction error for quadratic models, and a fourth test data block may, optionally, comprise either a Latin Hypercube (SFLH) configuration that evenly distributes test points over an entire test space defined by the factors, or an I-optimal configuration that minimizes prediction error for up to cubic models and 3-factor interactions. A fifth block may be defined in the block library to collect validation data. The fifth block of data may be collected first. The fifth block may be designed last but it is typically used first in the testing process.

The factors may comprise a range of speed of a body of the aerodynamic model, ranges of positions of control surfaces of the aerodynamic model, RPM ranges of one or more rotors of the aerodynamic model, or other factors that are of interest with regards to a particular aerodynamic model. In general, the factors may be selected by a user or Subject Matter Expert (SME) in order to provide the required input to RAM.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
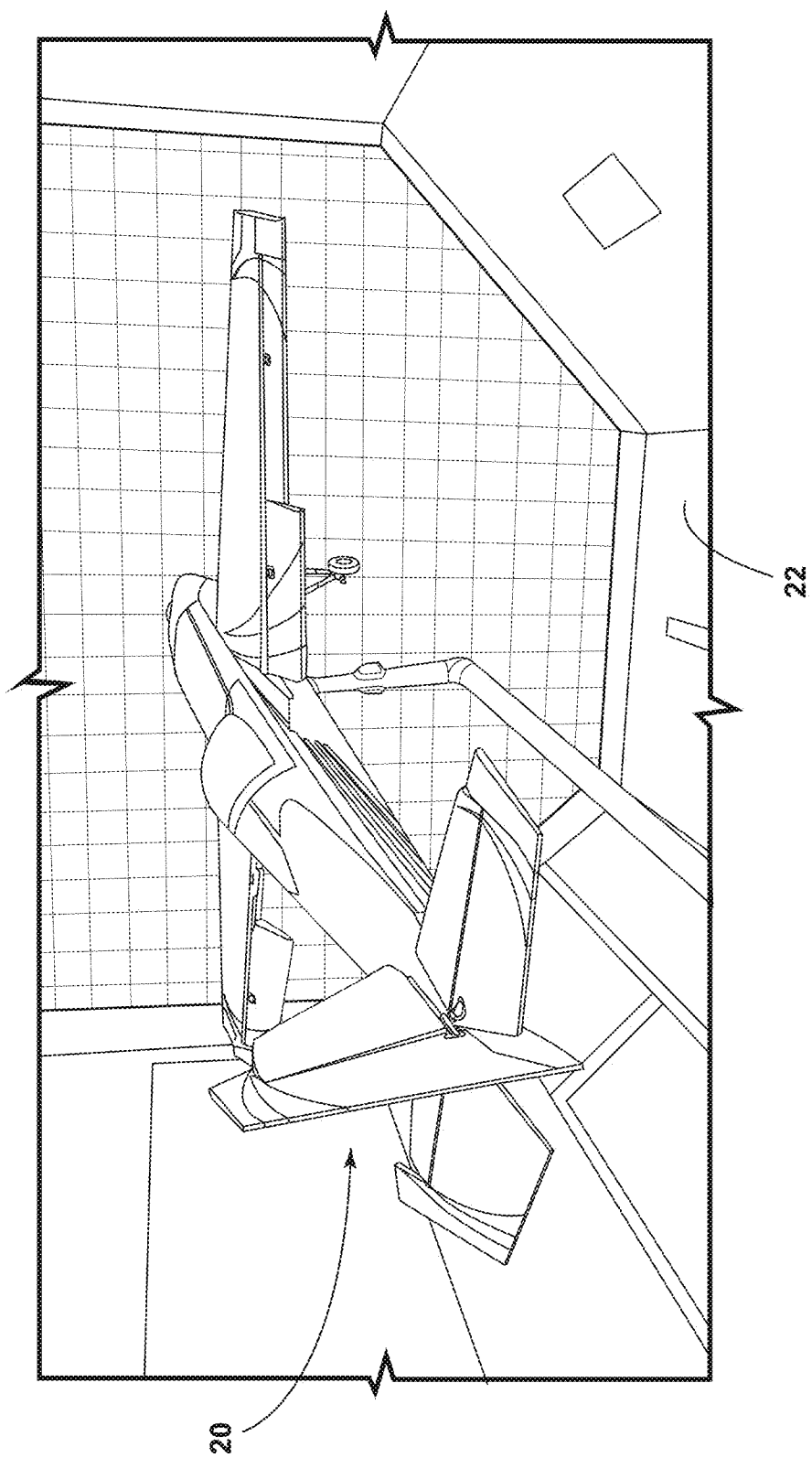
FIG. 1 is a partially fragmentary isometric view of an aircraft model in a wind tunnel.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise (as shown in FIG. 1). The following nomenclature is used in this disclosure:

Nomenclature $B_i$ = regression coefficients
$c_l$ = section lift coefficient
$c_d$ = section drag coefficient
$c_m$ = section pitching moment coefficient
$e^*$ = normalized residual
$e^*_{cv}$ = prediction error metric based on binomial analysis of residuals
NRMSE = normalized root-mean-square error
L, M, N = body-axis aerodynamic moments, ft-lbf
u, v, w = body-axis velocities, fps
X, Y, Z = body-axis aerodynamic forces, lbf
$x_i$ = regressors
Y = response variable in regression equation
α = angle-of-attack, deg
β = sideslip angle, deg
ε = error in regression model
σ = standard error Aerodynamic modeling for flight dynamics studies plays an important role in aircraft development programs. This may be especially true for new complex vehicle designs proposed as part of Urban Air Mobility (UAM) systems that combine features of both conventional aircraft and rotorcraft. Areas of increasing interest include autonomous systems, distributed electric propulsion, and electric vertical takeoff and landing (eVTOL) configurations.

The new design space offers significant opportunities, but it also involves vehicles with substantially more complex and non-linear aerodynamic responses, as well as increased complex interactions among propulsion and aerodynamic control systems. Resources required for modeling depend on the design stage considered where the levels of model fidelity typically increase as the design progresses. In early design stages, lower fidelity models may be sufficient for some aircraft configurations. However, eVTOL designs having rotors, propellers, tilting wings, control surfaces, and fuselage, may result in a greater number of factors and interactions to consider. This significantly increases design complexity and may reduce or defeat the utility of lower fidelity models. At a given design stage, Subject-Matter Experts (SME) may determine what level of fidelity is adequate for their problem.

The complexity issue drives demand for more resources to develop suitable models for design and simulation. This may limit the ease of design changes while advancing through various design stages. Although advances in computer technology have facilitated more effective tools to tackle these issues, obtaining greater model fidelity may still require a significant investment of engineering time and resources, both analytically and experimentally.

A Rapid Aero Modeling (RAM) process according to one aspect of the present disclosure improves the modeling process and reduces the various complexity issues, resource demands, and other adverse impacts described above. A preliminary study of a RAM concept is described in U.S. provisional patent application Nos. 62/972,674 and 63/116, 422 (hereinafter "provisional applications"). The preliminary study describes potential metrics, algorithms, and procedures that allow the RAM process to be implemented in an automated fashion. The preliminary study utilized an aircraft model 20 (FIG. 1) that was tested in a wind tunnel 22. This preliminary study was designed to evaluate candidate procedures and metrics to support the RAM process applied in a wind tunnel 22, which may be referred to herein as a "RAM-T" process. This RAM-T study demonstrated that the sequential automated testing (RAM) process is capable of producing models below specified prediction errors. An automated RAM-T (wind tunnel) process is described in the provisional applications, which are incorporated herein by reference.

Figure 2:
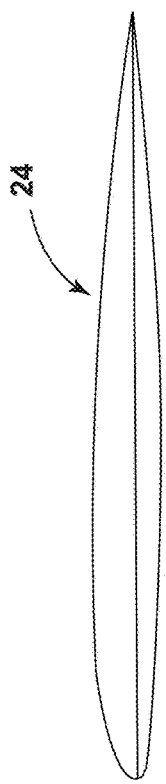
FIG. 2 is a rotorcraft airfoil (SSC-A09) profile.

One aspect of the present disclosure is an automated RAM process that utilizes computational experiments (RAM-C) rather than wind tunnel testing. As discussed in more detail below, the RAM-C process of the present disclosure may be utilized to develop an aircraft model corresponding to a basic rotorcraft airfoil (SSC-A09) (FIG. 2), a Lift+Cruise (L+C) vehicle 25 (FIG. 3), or other aerodynamic (vehicle) models. In general, as used herein, "test" may refer to a physical test (e.g., in a wind tunnel) or a computer test (e.g., a CFD program).

A method according to one aspect of the present disclosure may involve testing rotorcraft airfoil 24 (FIG. 2) utilizing a CFD program over a large range of Mach number and angle of attack.

A RAM-C process 30 (FIG. 4) according to the present disclosure may utilize two feedback loops. Specifically, a first (inner) loop updates model order 52A using a sequence of predefined data test blocks, and a second (outer) loop updates test-region splitting 52B after reaching model-order limits of the sequential data test blocks.

The simplified flowchart (FIG. 4) of the general RAM concept 30 describes the RAM-T and RAM-C (computer CFD) processes. User-defined fidelity is input at experiment design 32, and a sequence of pre-design experiments in the form of sequential design of experiments (DOE) blocks 34 of test points appropriate for the vehicle under test are developed at 36. As discussed in more detail below, the DOE blocks 34 may comprise a series of "generic" (non-scalar) test blocks with predefined test points. The generic DOE blocks 34 may initially comprise predefined test points in a range of [−1, +1] (e.g., FIG. 10) or other format that can be utilized to form scalar test points for a specific test.

Figure 4:
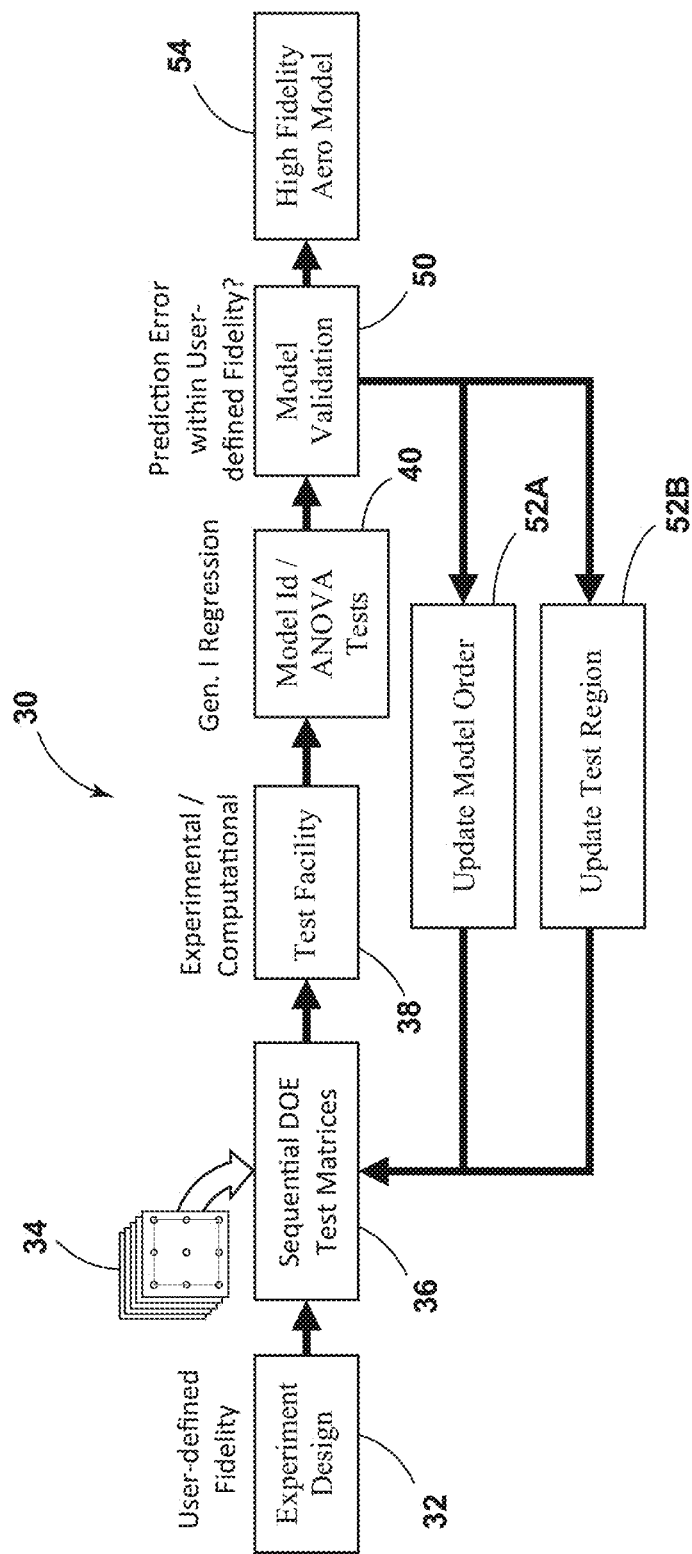
FIG. 4 is a block diagram comprising an overview of the RAM process.

With reference to FIG. 4, at step 36 a user inputs ranges for each factor, and the RAM code creates test points based on the "generic" DOE blocks 34. For example, if a factor is an angle of attack in the range of 0°-90°, at step 36 the RAM code replaces −1 with 0 in each block of the series, and replaces +1 with 90° in each block of the series to thereby generate a series of input test blocks as required for a specific design/test. In general, the sequential test blocks may correspond to polynomial models having increasing order. Thus, if a lower order model satisfies the criteria at step 50, the higher order test blocks do not need to be tested at 38. A test facility 38 may comprise an experimental facility (e.g., wind tunnel) or a CFD program. The test facility 38 processes each test block 34 to produce measurements for model identification, and the resulting stepwise regression and Analysis of Variance (ANOVA) tables characterize the relative significance of model terms and other sources of variation at 40. Effectively, the RAM process provides a control loop around the vehicle under test that guides the test through a series of test blocks 34 that are used to estimate models and evaluate their performance. The series of test blocks 34 utilize the sequential nature of designed experiments, and the RAM process only requires more data if it is needed for either estimating a higher-order model or for more detailed investigation in a region where model performance is inadequate.

The test is completed when model validation tests 50 are passed (e.g., using pass-fail validation criteria), indicating that a requested level of fidelity has been achieved at 54. If the validation criteria are not satisfied at 50, the next test block 34 in the sequence is utilized (model order is updated at 52A) and the next test block in the sequence is utilized in another test at test facility 38. If all of the test blocks 34 have been utilized without satisfying or passing model validation criteria, the model may be updated (e.g., by splitting regions at 52B that do not meet or pass validation criteria), and the sequence of test blocks can be repeated in application to the new sub-regions to obtain a new updated model. In general, the choice of identification methods, prediction error metrics, and how the test regions are split are not restricted by the RAM process. It will be understood that regions may be split prior to utilizing all of the test blocks 34, and the process may then return to the first test block.

Referring again to FIG. 4, if four sequential test blocks are utilized, the first test block will be tested at 38. If the results of test 38 do not meet predefined fidelity criteria at step 50, the model order is updated at 52 (i.e., the next test block in the sequence is utilized), and test 38 is conducted using the second test block. This is repeated with the third and fourth test blocks if the predefined fidelity criteria is not met at 50. If the predefined fidelity criteria is not met at step 50 after the fourth test block is tested, one or more test regions are updated (e.g., divided or split into sub-regions) at step 52B, and the process is repeated using the first, second, third, and fourth sequential test blocks. It will be understood that the present disclosure is not limited to the example above, and one or more test regions could be split prior to testing the last block (the fourth test block in this example).

Figure 3:
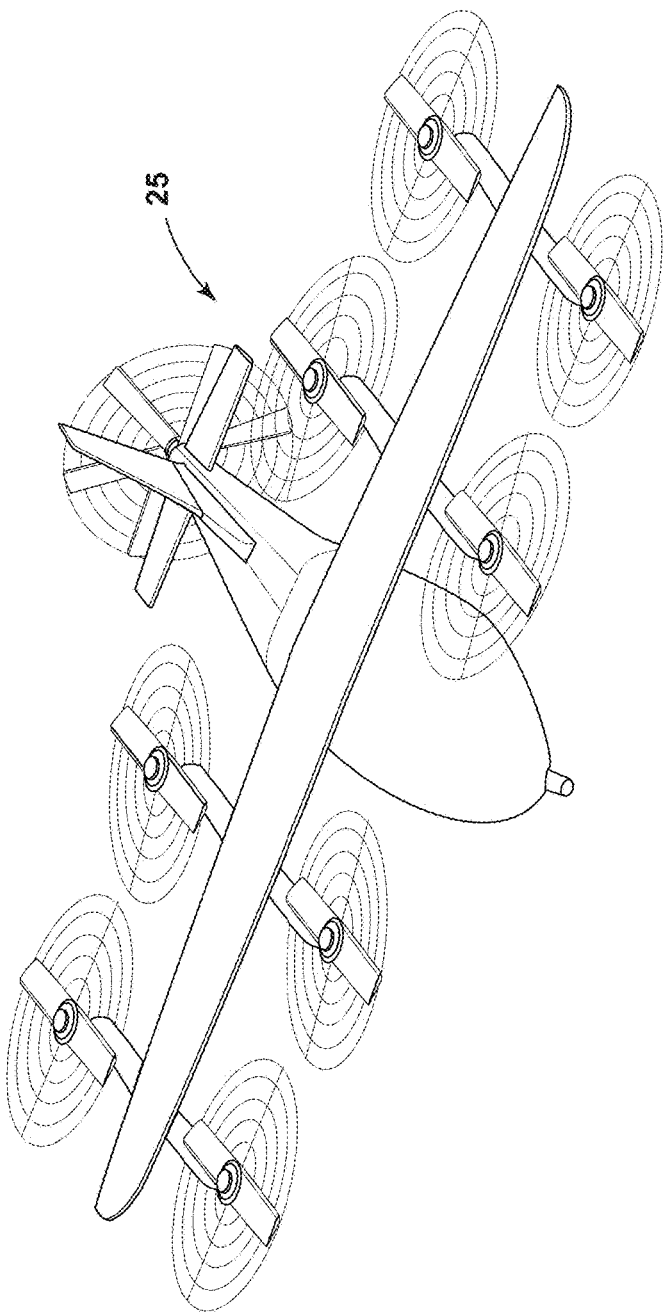
FIG. 3 is an isometric view of a Lift+Cruise (L+C) vehicle.
Figure 5:
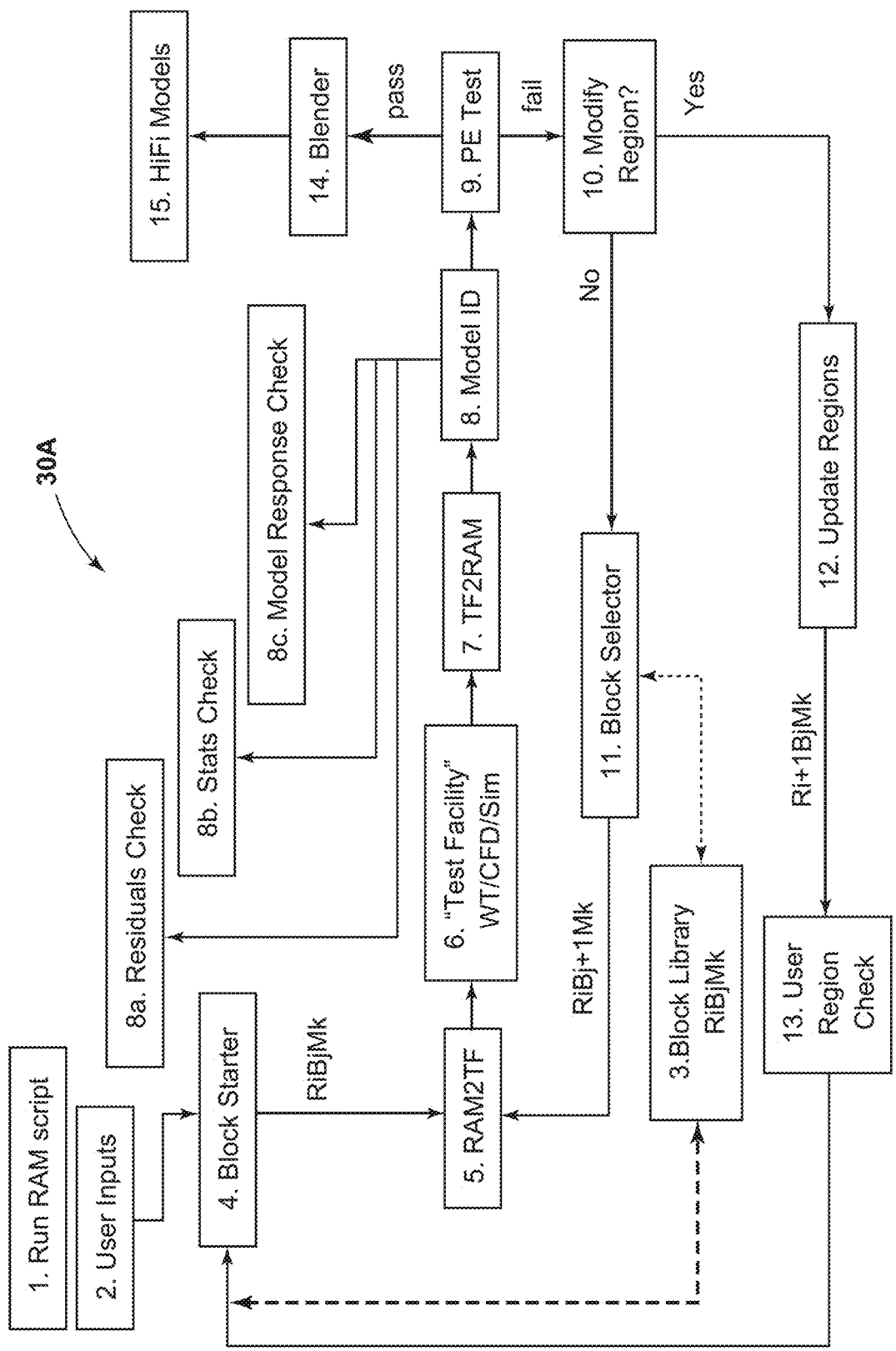
FIG. 5 is a block diagram showing the RAM-C process.

With further reference to FIG. 5, a flowchart 30A shows the RAM process in more detail. In general, some aspects of a given design (e.g., shape of an aircraft, type and number of propulsion units) are known at the time the process 30A is initiated. However, this information is typically insufficient to develop an accurate polynomial model capable of predicting the forces acting on an aircraft under various operating conditions. In order to distinguish between flowchart blocks and RAM data blocks, the flowchart blocks (FCB) are referred to using the notation FCB (#). Referring to the upper left of FIG. 5, FCB (1-2) show the general script for running RAM and providing for user inputs. User inputs define test features such as the factors, factor ranges, and user-desired level of model fidelity. The RAM program code may also provide for input of three-dimensional (3D) computer aided design (CAD) data and other information corresponding to a specific model being developed (e.g., L+C Vehicle 25) (FIG. 3). FCB (3) is a library of pre-designed "generic" (non-scalar) test matrices in sets of five test blocks or test-matrix blocks, where each set is uniquely defined based on the number of factors involved for the test. For example, the library may have a set of five "generic" (non-scalar) test blocks (e.g., four sequential "generic" blocks and one "generic" validation test block) that are specifically designed for two factor tests, another set of five "generic" blocks that are designed for three factor tests, another set of five "generic" blocks for four factor tests, etc., up to and including sets of five blocks for very large numbers of factors (e.g., 15, 20, 25, or more factors). Once a set of "generic" test blocks for a specific number of factors is developed, the set of blocks can be used for any number of tests having the number of factors for which the "generic" test blocks were developed. The library preferably includes sets of "generic" blocks for a range of factors (e.g., 2-25) so that users can select a predefined set of blocks that is designed for the number of factors that are required by a user for a specific design. It will be understood that, in some cases, a user could select a set of "generic" test blocks having more factors than required, but this is generally not preferred due to the resulting computational inefficiencies.

These sets of test blocks guide experiments through sequential, optimized test points, wherein the sequence is designed to accommodate progressively more complicated models and minimize prediction errors. The sequential nature of the RAM process allows data collection to occur only when it is needed for either estimating a higher-order model or for a more detailed investigation in sub-regions where model performance is inadequate.

RiBjMk is used in the flow chart as an abbreviation to keep track of the $i^{th}$-region being modeled, $j^{th}$-test block under test, and $k^{th}$ aircraft mode currently being evaluated. Aircraft modes may be used to reflect significant configuration or mission changes such as speed regimes for vertical flight versus cruise flight. Details of the test blocks are described in more detail below. In FIG. 5, at FCB (4), the RAM code converts the generic (non-scalar) test matrices to reflect the initial factor ranges (scalar ranges) specified by the user. For example, as discussed below in connection with FIG. 15 and Table 3, if an aerodynamic model (polynomial equation) for the airfoil 24 (FIG. 2) is being developed, a user may utilize initial factors including an angle of attack from negative 30 degrees to positive 30 degrees, and Mach numbers from 0.3-1.1. In this example, a set of five generic test blocks (e.g., with factors in the range of −1, +1) designed for a two factor test are converted by the RAM code whereby the −1, +1 generic values are replaced with −30, 30 (angle of attack) and 0.3, 1.1 (Mach number). At block FCB (4), the code also adjusts the factor ranges when the regions defined by the ranges under test are required to be split or otherwise divided. As used herein, the term "split" generally means that a range (region) is divided into two or more smaller ranges or regions (sub-range or sub-region). Although a range (region) may be split (divided) at the center of the original range, a split could occur at other points in the original range. For example, if an original range comprises angles of attack from negative 30 degrees to positive 30 degrees, the range may be split at 0 degrees, or the split may occur at a different point (e.g., 10 degrees). Similarly, a split could be made at two points to create three new ranges (sub-ranges or sub-regions) which could be equal or non-equal. Virtually any type of split may be utilized as required to facilitate the modeling process.

After the generic test blocks are modified to form scalar test blocks for a specific test, at FCB (5) the RAM code converts the RAM test block information into a form appropriate for the test facility represented by FCB (6). In general, the test facility may comprise a wind tunnel, CFD code (program), or simulated experiment. In a RAM-C process, at FCB(6), the RAM code converts the scalar test blocks into a format that can be input to the CFD program as required. It will be understood that the required CFD format may depend on the specific CFD code being used. In the process of FIG. 5, at FCB (7), the RAM code converts the output data from the test facility format (e.g., CFD format) back to RAM format. In general, the RAM process (FIGS. 4-5), applied to the Test Facility 38 may be executed utilizing a RAM program (code) that utilizes test blocks configured to reflect factor ranges of the vehicle under test and to interface with existing CFD programs or wind tunnels. The RAM code may also prompt a user to supply inputs to configure the test blocks (specify factor ranges), split the test regions, input test validity criteria, etc.

In FIG. 5, FCB (8) denotes a user-selected model identification procedure that may be implemented by the RAM code. A process according to the present disclosure may utilize stepwise regression as discussed in more detail below. At FCB (8), the RAM code provides output to the user for monitoring progress. The output may include a residuals check 8a, a statistics check 8b, and a model response check 8c. Outputs from the stepwise regression and Analysis of Variance (ANOVA) tables provide key statistics and characterize the relative significance of model terms. It will be understood that outputs 8a-8c are examples, and additional or fewer outputs (or no outputs) could be utilized.

The next step in the RAM process of FIG. 5 is depicted as FCB (9). At this block, the RAM code applies a prediction error (PE) test based on validation data that is not used for estimation. The validation data may comprise the results from FCB (6) of a validation test block that is run prior to initiating the sequence of sequential test blocks. The PE test determines the progression of the RAM process. If the PE test is passed, meaning the fidelity criteria selected (predefined) by a user have been satisfied, then the final global model is estimated. However, if the PE test fails, then a decision is made either to use the next data block (test matrix), or to split the region under test. This decision may be made by the user, or the RAM program may be configured to implement the decision utilizing predefined criteria.

A RAM process according to one aspect of the present disclosure uses five data (test) blocks that are used in sequence to provide a progression from low-order models to high-order models. It will be understood that more or fewer data (test) blocks may be utilized, and the present disclosure is not limited to a specific number of blocks. After each data (test) block is tested at FCB (6), the RAM process uses the PE test to determine if more data is required, indicating a need to estimate a higher-order model. Although various suitable polynomial models may be utilized, the RAM process may utilize polynomial models that are limited up to third order. However, higher order polynomial models may also be utilized.

At FCB (10), the RAM program determines if all data (test) blocks have been used. If all data (test) blocks have not been used, then the RAM program proceeds to FCB (11) to obtain or select the next data (test) block. Alternatively, one or more test regions may be split. If the program determines in FCB (10) that all data blocks have been used, then the RAM process (program) proceeds to FCB (12) to split or update one or more of the regions under study. Before proceeding back to FCB (4) to obtain the next test matrices, FCB (13) provides users an opportunity to check or adjust the RAM progression. The final model may comprise a blending represented by FCB (14) over all of the regions that may have been split during the RAM process. Individual polynomial models covering a subset of the factor space may not perfectly intersect with neighboring models at their boundaries, which creates a discontinuity between modeling regions. In order to blend neighboring models, the RAM software (code) utilizes data from regions on both sides of the model intersection to create additional models spanning over the local intersections. The regions of overlap between local models are then smoothly combined using a polynomial weighting function. The results in FCB (15) indicate high fidelity models have been achieved.

Application of known DOE/response surface methodology (RSM) concepts provide guidance on setting up an efficient and statistical rigorous test plan, as well as providing a much higher probability of obtaining an adequate model. DOE/RSM theory may be utilized to develop a specialized series of test matrices (test blocks) that may be applied (used) in sequence. These data (test) blocks are initially stored in a RAM Block Library in a generic format, and are constructed in coded space to improve numerical calculations and to allow more general application as factor ranges vary for each region tested. The code may be configured to scale all of the factors in non-scalar for to lie in the range [−1, +1] as shown in equation 1.

$$\tilde{x} = \frac{x - (x_{min} + x_{max})/2}{(x_{max} - x_{min})/2} \quad (1)$$

It will be understood that the predefined "generic" blocks stored in the RAM library may have virtually any suitable form (e.g., a range [−10, +10]) that can be utilized to form specific test blocks as required for a specific design. In general, the RAM code utilizes scalar inputs from a user and the "generic" data blocks stored in the code library to form data test blocks having specific test points. The present disclosure may utilize RAM aerodynamic models having a polynomial model structure. However, other model structures may be utilized consistent with other aspects of the present disclosure. Five key principles of DOE support RAM and the sequential process to testing and modeling. Principles that may be used in DOE design include:

1. Orthogonal regressors—uncorrelated regressors to improve estimation calculations.
2. Replication—independent and repeated measurements to assess system noise and uncertainty.
3. Randomization—randomized input matrix to average out extraneous factors and unknown systematic errors.
4. Blocking—technique to improve precision and reduce variability due to known nuisance factors.
5. Sequential testing—a knowledge building process that allows each step to benefit from the previous one.

These principles provide benefits in designed experiments. For DOE tests in general, concept of blocking serves to reduce miscellaneous nuisance bias errors. In RAM experiments according to the present disclosure, blocking and sequential testing serve an additional purpose, namely performing sequential model identification that progresses from low-order models to higher-order models. Model identification may allow (optionally) only up to third-order polynomials and three-factor interactions. These higher-order terms typically appear in very limited numbers and, given the amount of data collected in a RAM process, the number of degrees of freedom for estimation may be very high. Final review of model terms may be conducted by SMEs to ensure the estimated coefficients are within expected ranges for the application. Specialization of RAM block designs for experiments using computational or analytical methods as the test facility are described in more detail below.

Figure 6:
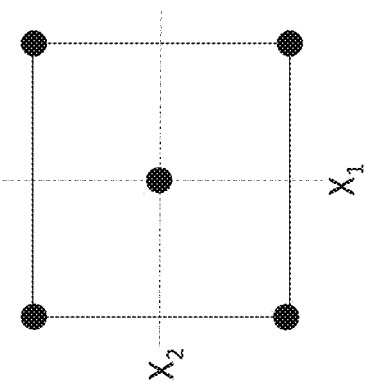
FIG. 6 is a full-factorial design in two-factor space.

One known DOE design is the factorial experiment. A factorial design is one in which all factors are varied for all possible combinations. Using two levels for each factor may be a run-efficient method for developing a first order plus interaction model. A full-factorial design and two-factor space is shown in FIG. 6 with the addition of a center point.

Replicated centers allow testing for curvature that may suggest further augmentation is required to support quadratic model terms. This type of information allows the investigator to sequentially build models and only incorporate increasing amounts of data as required. The supported regression model is shown with up to two-factor interactions (2FI) by equation 2:

$$y = B_0 + \sum_i B_i x_i + \sum\sum_{i \neq j} B_{ij} x_i x_j + \ldots + \varepsilon \quad (2)$$

$$i = 1, 2, \ldots, k$$

Figure 7:
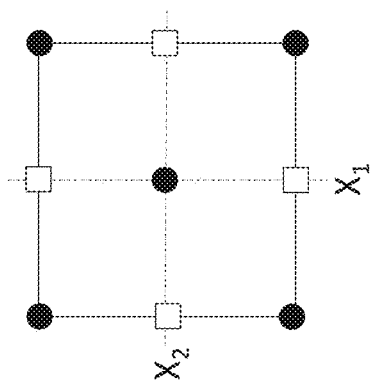
FIG. 7 is a face-centered central composite design in two-factor space.

The $B_i$, $B_{ij}$, are the fitted regression coefficients and the $X_i$ are the factors (independent variables or regressors). A refinement (augmentation) to the factorial design is the central composite design (CCD) which adds design points along the axes through the origin of the design space as shown by the square symbols of FIG. 7.

This approach supports a full second order model given in equation 3:

$$y = B_0 + \sum_i B_i x_i + \sum_i B_{ii} x_i^2 + \sum\sum_{i \neq j} B_{ij} x_i x_j + \varepsilon \quad (3)$$

$$i = 1, 2, \ldots, k$$

Figure 8:
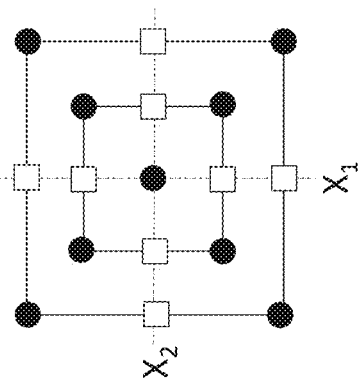
FIG. 8 is a nested face-centered design in two-factor space.

The location of the axial points defines this CCD as a face-centered design (FCD). The nested face-centered design allows the nesting of two FCD designs to support the addition of pure cubic terms to the empirical model. The two FCD's may be tuned by fractionating the factorial designs as presented by Landman, D., et al. ("Hybrid Design for Aircraft Wind-Tunnel Testing Using Response Surface Methodologies," Journal of Aircraft 44(4):1214-1221 (July 2007)), which is hereby incorporated by reference. The design in two-factor space is shown in FIG. 8 where the supported cubic model is given by equation 4:

$$y = B_0 + \sum_i B_i x_i + \sum_i B_{ii} x_i^2 + \sum\sum_{i \neq j} B_{ij} x_i x_j + \sum_i B_{iii} x_i^3 + \varepsilon \quad (4)$$

$$i = 1, 2, \ldots, k$$

DOE designs for a RAM process according to one aspect of the present disclosure may be developed as sequences of five blocks: (1) FCD, (2) nested FCD, (3) I-optimal designs that minimize prediction error for quadratic models, (4) I-optimal designs that minimize prediction error for up to cubic models, and (5) a validation block to obtain validation data. Space filling designs may also be utilized as alternate designs (e.g., for blocks (4) and (5)). It will be understood that the present disclosure is not limited to specific types of blocks or numbers of blocks, and the predefined blocks may be designed using virtually any suitable DOE approach.

The validation block may be applied separately at any point during the test but is preferably taken at the start to allow validation tests throughout the experiment on the results produced by each block in the sequence (i.e., the CFD code is typically applied to the validation input block first, and these results are then compared to the results of each sequential block as the results for each sequential block are developed by the CFD code). The use of five blocks is not required, but it has been found to be a reasonable choice for many cases. The series of blocks represent a progression of data collection that supports modeling polynomials from linear+2FI up to an including cubic+3FI. In designing the RAM library data blocks for cases with a large number of factors, optimization to minimize prediction errors may require machines with parallel processing capabilities. In cases where computational power is limited, the user may select a reduced-cubic model, and an SME may assist in selecting key cubic or 3FI terms as appropriate.

Figure 10:
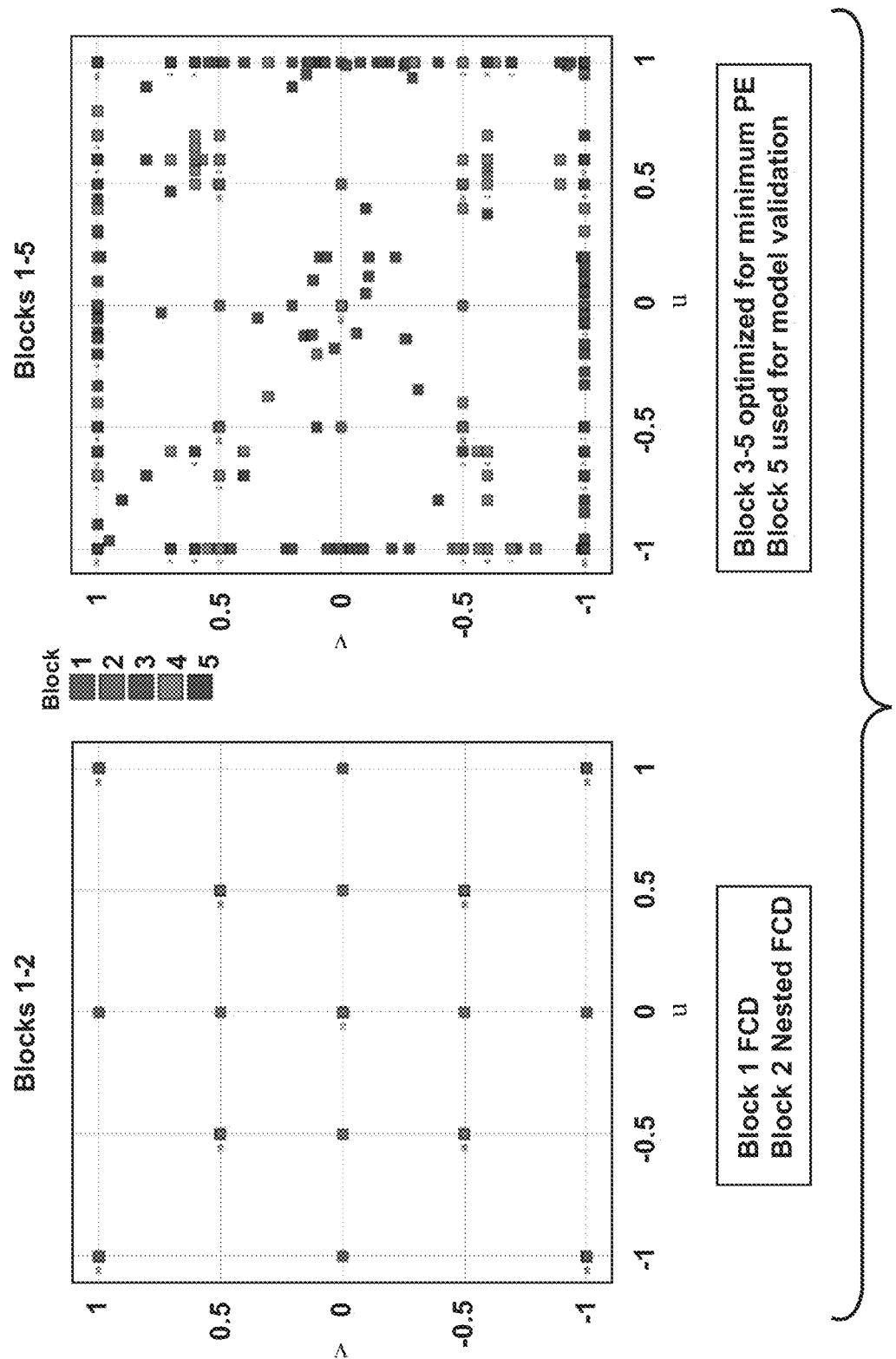
FIG. 10 show RAM data blocks for a 17-factor L+C study in coded units.

Using polynomial model structures, limited to a maximum of cubic+3FI terms, can lead to a requirement for dividing the global-model range into smaller regions. Polynomial models with higher-order terms than cubic can lead to parameter estimation problems and undesirable response and slope changes near the region end points. However, higher-order polynomials are typically unnecessary using the RAM splitting process. Splitting regions may be performed on dominant factors with strong aerodynamic non-linearities, such as angle of attack for conventional aircraft and forward velocity for rotorcraft. The split regions are blended in the final steps of the RAM process to provide continuous and smooth connections between split regions.

of an L+C configuration. Blocks are shown in coded form. The two body-axis velocities (u, v) plotted in FIG. 10 produce a representative graphic for any two factors chosen from the set of 17 factors. The graphic on the left side of FIG. 10 shows the first two blocks separately to highlight the specific location of these test points. The graphic on the right side of FIG. 10 presents all five blocks to show the level of data density required for the RAM modeling process in this example. Blocks 3-5 are I-optimal designs that minimize prediction error. Table 1 provides a corresponding list of all 17 factors and their respective ranges.

TABLE 1

Factor Ranges For L + C Test In Transition Flight

| # | Factor Label | Description | Range Low | Range High | Units |
|---|---|---|---|---|---|
| 1 | u | body-axis u | −5 | 95 | kts |
| 2 | v | body-axis v | −10 | 10 | kts |
| 3 | w | body-axis w | −10 | 10 | kts |
| 4 | LA | left aileron | −30 | 30 | deg |
| 5 | RA | right aileron | −30 | 30 | deg |
| 6 | LE | left elevator | −30 | 30 | deg |
| 7 | RE | right elevator | −30 | 30 | deg |
| 8 | RUD | rudder | −30 | 30 | deg |
| 9 | $n_1$ | Rotor 1 | 550 | 1550 | rpm |
| 10 | $n_2$ | Rotor 2 | 550 | 1550 | rpm |
| 11 | $n_3$ | Rotor 3 | 550 | 1550 | rpm |
| 12 | $n_4$ | Rotor 4 | 550 | 1550 | rpm |
| 13 | $n_5$ | Rotor 5 | 550 | 1550 | rpm |
| 14 | $n_6$ | Rotor 6 | 550 | 1550 | rpm |
| 15 | $n_7$ | Rotor 7 | 550 | 1550 | rpm |
| 16 | $n_8$ | Rotor 8 | 550 | 1550 | rpm |
| 17 | $n_9$ | Pusher-Prop | 750 | 1750 | rpm |

TABLE 2

Maximum (worst case) values of sample design metrics (17 Factors) for L + C.

| Block Type | Blocks (inclusive) | Pts. | Design Terms | VIF | FDS | % Power 2σ, s/n = 2 |
|---|---|---|---|---|---|---|
| Minimum Resolution V FCD | 1 | 194 | Quadratic | 14.38 | 0.26 | 79.7 |
| Nested FCD | 1, 2 | 388 | Quadratic | 30.01 | 0.52 | 84.9 |
| I-optimal | 1, 2, 3 | 578 | Quadratic | 3.09 | 1.0 | 99.9 |
| I-optimal | 1, . . . , 4 | 783 | Red. Cubic | 13.99 | 1.0 | 99.9 |
| Alternate (SFLH) | 1, . . . , 4 | 783 | Red. Cubic | 11.20 | 1.0 | 99.9 |
| Validation (I-opt) | 1, . . . , 5 | 858 | Red. Cubic | 14.78 | 1.0 | 99.9 |
| Alternate (SFLH) | 1, . . . , 5 | 858 | Red. Cubic | 12.28 | 1.0 | 99.9 |

The transition region may be challenging for modeling L+C vehicles (e.g., vehicle 25, FIG. 3) and other complex eVTOL vehicles since all control surfaces and propulsors are used, the aerodynamics change rapidly with flight conditions, and there are significant airframe-propulsion interaction effects.

Figure 9:
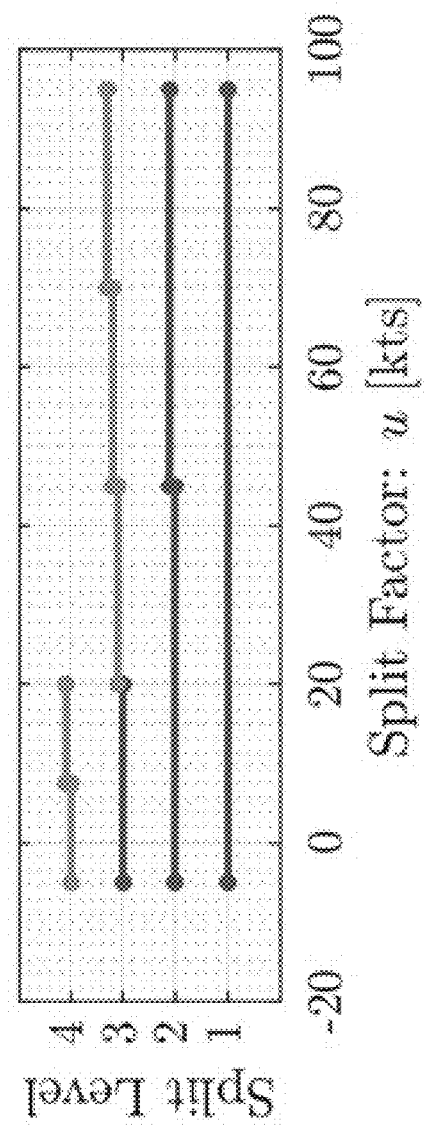
FIG. 9 shows RAM-C speed regime splits for an L+C study.

FIG. 9 shows the splits in analysis of the transition region for an L+C vehicle according to one example. Color coding in FIG. 9 is used to indicate where models are successful (green) and where they fail (red). Splitting is discussed in more detail below in connection with final modeling results.

FIGS. 9-10 and Tables 1-2 provide examples of a RAM experiment design and modeling process and provide a basis for the modeling results discussed below. An example five-block RAM design is shown in FIG. 10 for a 17-factor study Table 2 shows exemplary design metrics used in building each DOE (test) block of this example. In this example, each block was designed using either software products available under the names Design Expert (Design Expert software, version 12, by Stat-Ease, Inc.) or JMP software (IMP software, version 14, by SAS Institute Inc.). As part of the experiment design work, the investigator may define the confidence level required, signal/noise ratio for the test apparatus, and the minimum level of response detection required. However, in the execution phase, the investigator may also pre-define a level of acceptable prediction error for validation tests in order to confirm an adequate model and to prevent over-collecting data. As described above, each block reflects the sequential collection of data that allows progressively more complex models to be estimated, and the test only moves forward collecting more data if more data complex models are required to meet PE requirements. In the example study (Table 2), data test blocks 4 and 5 were developed using both I-optimal and as alternates space-filling Latin Hypercube (SFLH) designs. In the example study, the results using the I-optimal blocks 4 and 5 were compared to the results using the SFLH blocks. In general, the I-optimal blocks and the SFLH blocks may both provide acceptable results. However, for a typical case using CFD, only the I-optimal blocks 4 and 5 are utilized. It will be understood that the predefined ("generic") test blocks may be developed utilizing various DOE approaches. SFLH are common experiment design choices for simulation studies. A validation block (or blocks) may be developed at the same time as the other blocks to ensure that the optimization selects validation points that are different from model estimation points. In general, if the predefined "generic" (non-scalar) blocks are FCD, Nested FCD, and I-optimal, each block in the sequence may be developed to take into account the other blocks in the sequence (e.g., to avoid use of the same test points). However, if SFLH blocks are utilized, these blocks may be developed without taking into account the other blocks in the sequence.

The first design metric in Table 2 is the inflation factor (VIF) that represents the degree of orthogonality for the regressors. Values of VIF are equal to one if regressors are perfectly orthogonal. Values over 10 represent a degradation of orthogonality in certain regressors and may require further design evaluations. Fraction of Design Space (FDS) is a visual tool that may be used for evaluating the standard error profile over the design space. This is typically the preferred metric when large numbers of factors are considered. The FDS number represents the fraction of the design space within the expected variance parameters. For the design process, an assumption is made that standard deviation is 1 to allow relative predictive error to be computed. For the evaluation of this example, a very conservative assumption is made that the signal-to-noise ratio is only 2. The last metric of Table 2 indicates the experimental power (to avoid type 2 errors) for which values over 80% are acceptable. Maximum values of the design metrics shown in Table 2 were selected from a survey of all model terms and selecting the worst-case term to show each block design was progressing and improving the overall design as blocks of additional design points were added.

The first three of five RAM blocks in Table 2 present a sequence of designs that define the primary test sequence. The last two blocks are either I-optimal designs, based on minimizing the integrated prediction variance over the design space, or as an alternate design test, SFLH designs to evenly distribute test points over the entire space. For cases with large number of factors, as in present L+C example, the design metrics for the first three blocks may be evaluated against a full quadratic model and the remaining blocks may be evaluated assuming the presence of cubic terms without three-factor interactions. For cases with fewer numbers of factors, the designs may be tests against models with cubic plus 3-factor interactions.

The VIF values in block 2 show the cost of adding more data, in the form of a nested FCD, to capture potential cubic nonlinearities. The nested FCD is particularly useful in aerospace applications since it is designed to handle non-linear responses and ensure the full range of factors are covered. This may be important for modeling aircraft surface deflections. I-optimal block 3 adds new runs bringing all the design metrics to satisfactory levels. The first three blocks may be enough for modeling the aerodynamic coefficients, especially in the lower angle-of-attack region below stall, where models are expected to mildly quadratic. Minor degradation to VIF is caused by adding block 4, but this is not a significant issue since the FDS metric, the preferred metric for response surface modeling, is still satisfactory. Block 4 provides additional modeling data to support modeling if model complexity demands higher-order terms. Block 5 is also an optimal design and is used only for validation. Optimal blocks are useful for validation data because the optimizer avoids using existing design points.

The general process of guiding model identification in RAM is applicable to both computational and physical test environments. A commonly used process for aircraft model identification is described in the provisional applications. In a RAM process according to an aspect of the present disclosure, model identification methods used in RAM may be adapted from a system identification programs for aircraft (SIDPAC) software toolbox. Results of model identification for rotorcraft airfoil and L+C configuration, in a fully automated RAM process, are discussed in more detail below. These results were obtained using a CFD test environment.

According to one aspect of the present disclosure, the primary method for model identification, specifically model structure determination and parameter estimation, may be accomplished using stepwise regression. This is a known method that is broadly used in many science and engineering applications. However, a RAM process according to the present disclosure does not restrict a user to a single method of model structure determination and parameter estimation. The identification process is improved for eVOTL configurations using models where the aerodynamic responses are defined in dimensional form and ranges for freestream velocity are defined in terms of body-axis velocities. This approach allows more straightforward modeling of flight conditions representing slow transition, vertical, and hover flight, where freestream velocity can be zero or very small.

Objectives in the RAM modeling process may include: (1) minimizing standard error to get an adequate model fit, (2) minimizing prediction error to get a useful model, and (3) only collecting enough data to meet the precision, prediction, and validation requirements. These objectives reflect a balance among the precision demanded by the experimentalist, the capabilities or precision levels possible by the test apparatus, and the time and cost required to meet those demands. In general, it has been shown that improvements made by decreasing fit error must be balanced against potentially increasing prediction error. A basic goal may be to expand data collection only enough to meet the model complexity requirements. The validation step supports these objectives. It will be understood that the present disclosure is not limited to these objectives.

Validation, FCB (9) (FIG. 5), is used to test model performance. This step determines whether the estimated model is a good predictor of the system responses within user-defined bounds. The PE test provides a metric for this purpose. A practical method for assessing validation is to observe the residuals between measured and predicted responses. For well-designed experiments that result in adequate models, the residuals appear as white noise with magnitudes generally within the specified acceptable levels. Not every residual test point will meet the acceptable error boundary limit, however. As described in "DeLoach, Richard, 'Assessment of Response Surface Models Using Independent Confirmation Point Analysis,' AIAA 2010-741, 48$^{th}$ AIAA Aerospace Sciences Meeting and Exhibit, Orlando, F 2010," success or failure of a given validation test-point residual to meet the requirement criteria can be judged as a binomial (pass-fail) experiment.

For complex vehicle tests where large numbers of data points are required, such as for the L+C study described herein, the RAM process may use 75 test points for validation. In this case, the critical binomial number is 66, based on models estimated at a 95% confidence level, and allowing only 1% inference error in the binomial test. This implies that the worst nine validation residuals define the level for an adequate model. If the residuals are normalized by the response variable maximum absolute value, defined as e*, then the critical binomial number defines a benchmark or PE test metric, $e^*_{cv}$, that marks an acceptable percentage of failed residual responses. For statistically small validation data sets, the preferred PE metric is the normalized root-mean square error (NRMSE) of the validation residuals. In either case, the PE test metric is simply a benchmark to assess how well the model predicts validation responses. The acceptable level of model fidelity is set by the investigator. Example applications of the two PE test metrics are discussed in more detail below.

Figure 11:
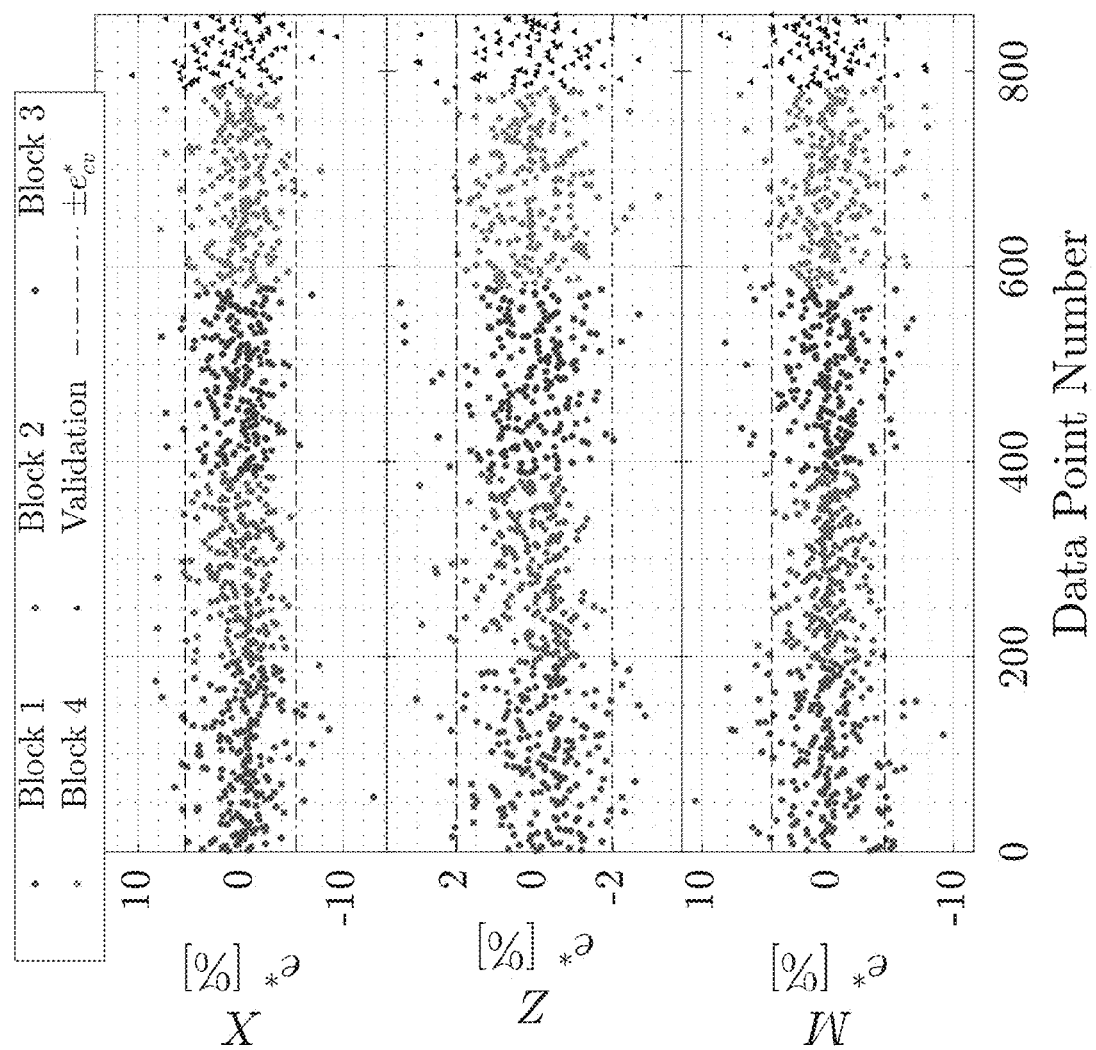
FIG. 11 is a graph showing example residuals for X, Z, and M models, L+C, 17-factor physical experiment.

FIG. 11 shows an example case for the L+C axial-force, normal-force, pitching-moment normalized modeling and validation residuals after using all five blocks of data (test blocks) in a region with forward velocity between 20 kts and 45 kts. Validation points (block 5) are indicated by black triangles as a data point symbols. The residuals plotted against run number show no trends during the experiment and present an acceptable error process for regression, indicating no other variables or processes are confounded with the data. Included in the graphic are error bounds that show the prediction error (PE metric) achieved for this test.

Aerodynamic modeling reflects the objectives and intended use of the resulting mathematical models. An objective for RAM is to generate models that capture the important features of complex vehicles in a manner suitable for flight dynamics simulations. The same objective applies to RAM-C, except a goal is to obtain models from computational codes. For the present disclosure, the NASA OVERFLOW CFD code is chosen to represent the "Test Facility" block in FIG. 5. Flight tests and wind tunnels offer alternate sources of aerodynamic information. However, these physical testing approaches require substantial investments of time and resources. Consequently, test efficiency is an important factor addressed by the RAM process of the present disclosure. In early design stages, however, where conceptual designs need to be evaluated by several disciplines, the only practical source for aerodynamic information may be from computational studies. For complex vehicles, researchers may be drawn to sophisticated computational simulations. However, for the flight dynamics and controls disciplines, detailed CFD models may not be capable of producing results fast enough for real-time flight simulations. Aerodynamic models in the form of polynomial equations solve this issue, but these models must satisfy user-defined fidelity levels in order to have practical value.

Application of RAM according to one aspect of the present disclosure to computational experiments may offer benefits that cannot be realized in physical experiments. In simulated tests most factors are relatively easy to change, unknown and known sources of variability are reduced or eliminated (limitations and assumptions made in the CFD code are set by the practitioner's choices), and random errors, in the form of measurement noise, are not present in either the inputs (regressors) or the outputs (responses). Without measurement noise, the primary source of residual errors is typically due to modeling errors. This effectively eliminates requirements in designed experiments to include replication, randomization, and blocking of nuisance variables. However, designed experiments for RAM are developed with these design features remaining present. The benefit is to substantially reduce the size of the Block Library required for a RAM process with only a very small penalty in testing and analysis. Although replicated points do not provide new information, they represent a very small number of extra data points relative to the total number of points required for modeling a complex vehicle. And replicated points can be useful to monitor any simulation result changes, especially when using advanced CFD methods where changes in convergence criteria or unsteady aerodynamic regions can impact responses. Retaining randomization has no impact on analysis of simulated data and retaining blocking in RAM retains a primary goal of sequential modeling from lower-order to higher-order models.

Regression (ordinary least squares) analysis is a valid modeling technique when applied to either simulated or physical tests. Consider that six of the seven primary assumptions behind regression are still satisfied in a RAM-C test and analysis: (1) models are linear in the coefficients while regressors can be nonlinear, (2) residuals have a population mean of zero, (3) independent variables are uncorrelated with the residuals, (4) residuals are uncorrelated, (5) residuals present constant variance, and (6) independent variables are sufficiently uncorrelated (RAM designs optimize regressors to be as orthogonal as possible and minimize prediction errors). The last assumption is that residuals are random and normally distributed. The assumption of normality is optional for application of ordinary least squares, but it is important to allow various statistical tests to be performed. For RAM-C normality is not required to obtain an unbiased and minimum variance regression model. However, the primary change when RAM is applied to simulated tests is that, although the models can provide accurate response predictions within the range of factors considered, no statements can be made about parameter confidence intervals, a mean response, or corresponding prediction intervals. In this case, the PE test metric simply becomes a device to assess relative model adequacy without any statement of confidence levels or prediction intervals. It is worth noting that for complex eVTOL vehicles, very large data samples are required which in turn can produce residuals that pass normality tests. Those cases are similar to physical experiments with extremely low noise levels.

A RAM-C process according to the present disclosure may use computational methods to produce aerodynamic forces and moments given the selected input factors. These factors include flight conditions and control inputs. A range of computational methods can be used, representing different levels of fidelity. The NASA OVERFLOW CFD code may be used, which solves the compressible Reynolds-Averaged Navier-Stokes equations on a collection of overset, structured grids. The Chimera overset grid approach is suited to multiple-body or moving body applications and has been used extensively for rotorcraft and UAM configurations.

Figure 12:
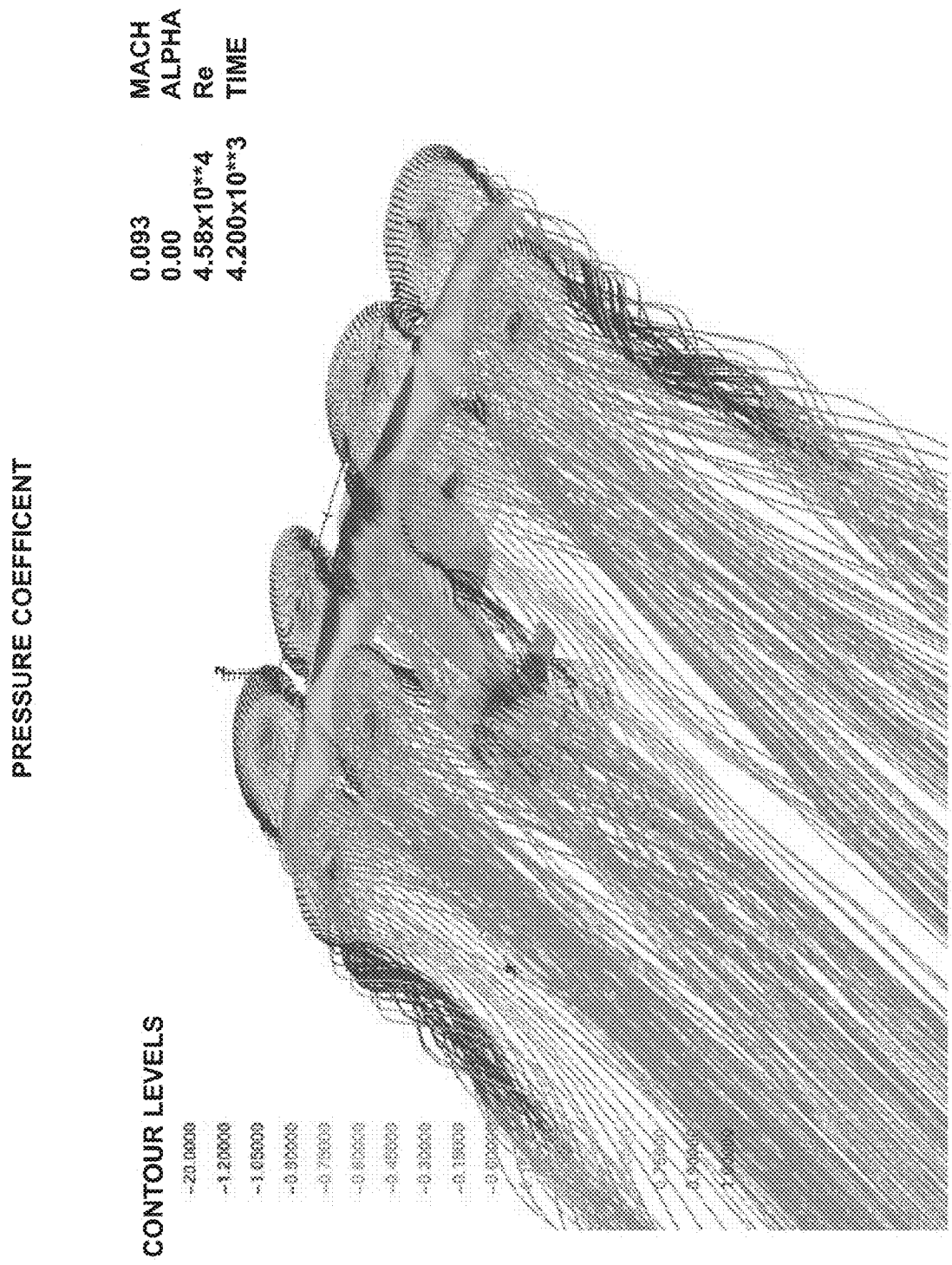
FIG. 12 shows computation results for an L+C vehicle in horizontal flight.

The choice of computational method is a function of user expertise, available time and computational resources, as well as physical modeling fidelity required. In the case of eVTOL configurations, nonlinear interactions between vehicle components such as the wing, control surfaces, fuselage, and rotors can be important influences on the overall vehicle performance and on modeling requirements. Demanding flow conditions include hover, vertical flight, and transition, where rotor wash over the wing and tail has a significant aerodynamic effect (FIG. 12). These complex conditions suggest the use of a CFD method; alternatives requiring less time and computational resources might include VSPAero, NDARC, or CAMRAD II.

Figure 13:
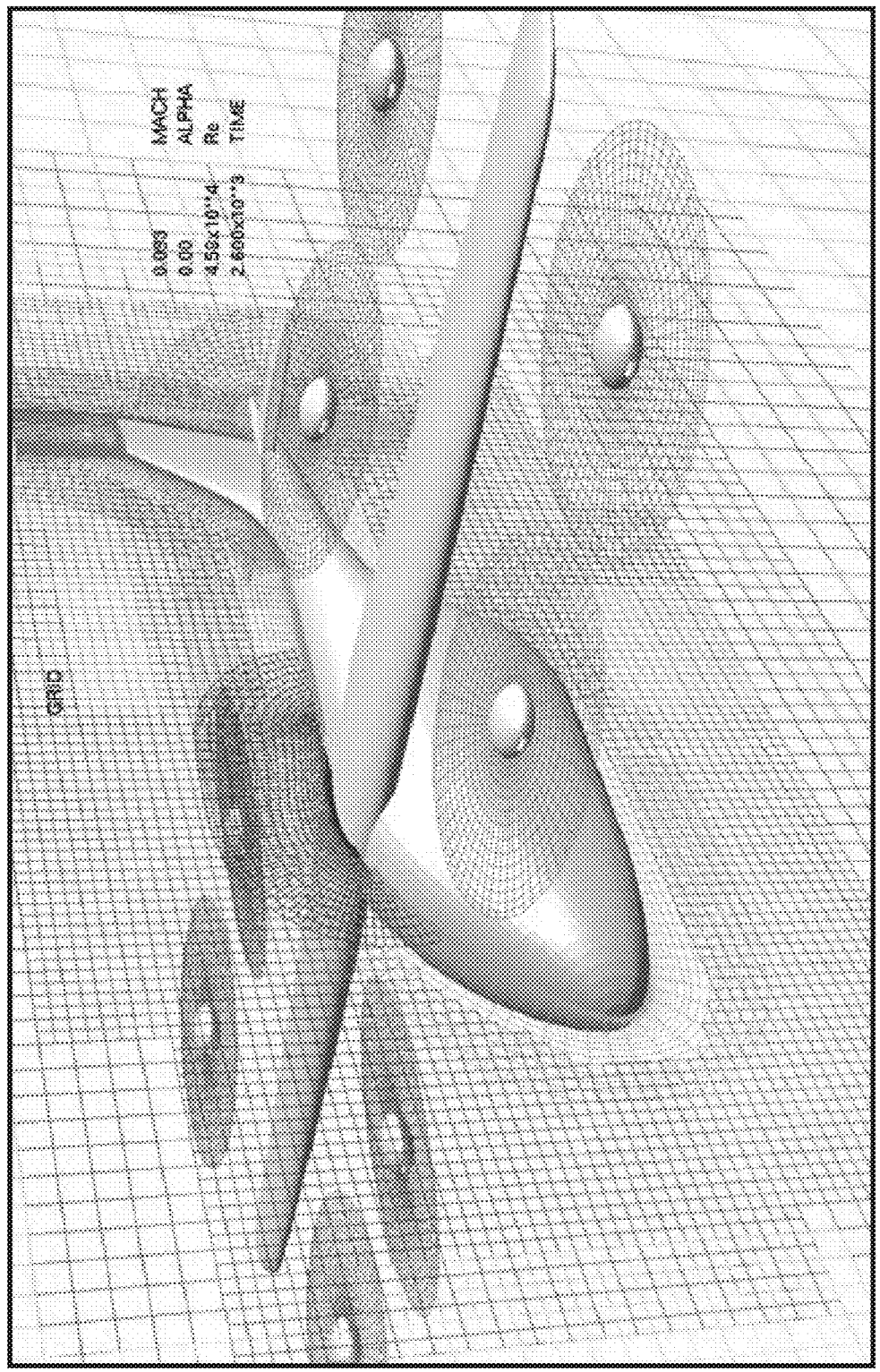
FIG. 13 shows a CFD overset grid system for an L+C vehicle.

For a Lift+Cruise configuration according to one aspect of the present disclosure, a coarse computational grid of four million points was created. This included wing, fuselage, horizontal and vertical tails, and disks for the eight rotors and pusher propeller shown in FIG. 13. These latter components were modeled using a rotor disk methodology rather than fully modeling rotating blades. This was done to reduce the grid size and to encourage steady-state flow solutions. The geometry was simplified by removing the support struts for the eight rotors, and the landing gear. To further simplify the gridding requirements, control surface deflections were modeled by deforming the surface grids, ignoring the gaps at the ends of each control surface. These approximations were justified on the basis that this was a proof-of-concept experiment. The goal was to produce an aerodynamic model that could be tested by the flight dynamics community and did not represent an actual flying vehicle. The current grid system is considered adequate to model basic interactions between rotor-induced flows and the vehicle structure, though grid refinement studies and unsteady flow simulations were not performed. These choices, and the tradeoffs with other computational methods will need to be revisited for an actual flight vehicle. With these approximations, each test point was calculated in two hours on one node of an existing supercomputing system. In this example, typical the NASA Advanced Supercomputing (NAS) Pleiades system. Typical runs were made generating 50 test points simultaneously, limited by availability of resources on the system. It will be understood that virtually any suitable computer system may be utilized in connection with the present disclosure.

RAM-C Modeling Examples

RAM-C according to the present disclosure is demonstrated by application to two modeling examples that show the wide range of modeling problems that can be handled by this method. The first case is an airfoil study to highlight how the RAM-C process can overcome common difficulties in modeling where significant nonlinearities are present in aerodynamic responses. The second case is an eVTOL configuration, L+C, demonstrating the utility of RAM-C for complex vehicles.

Airfoil Study

Figure 14A:
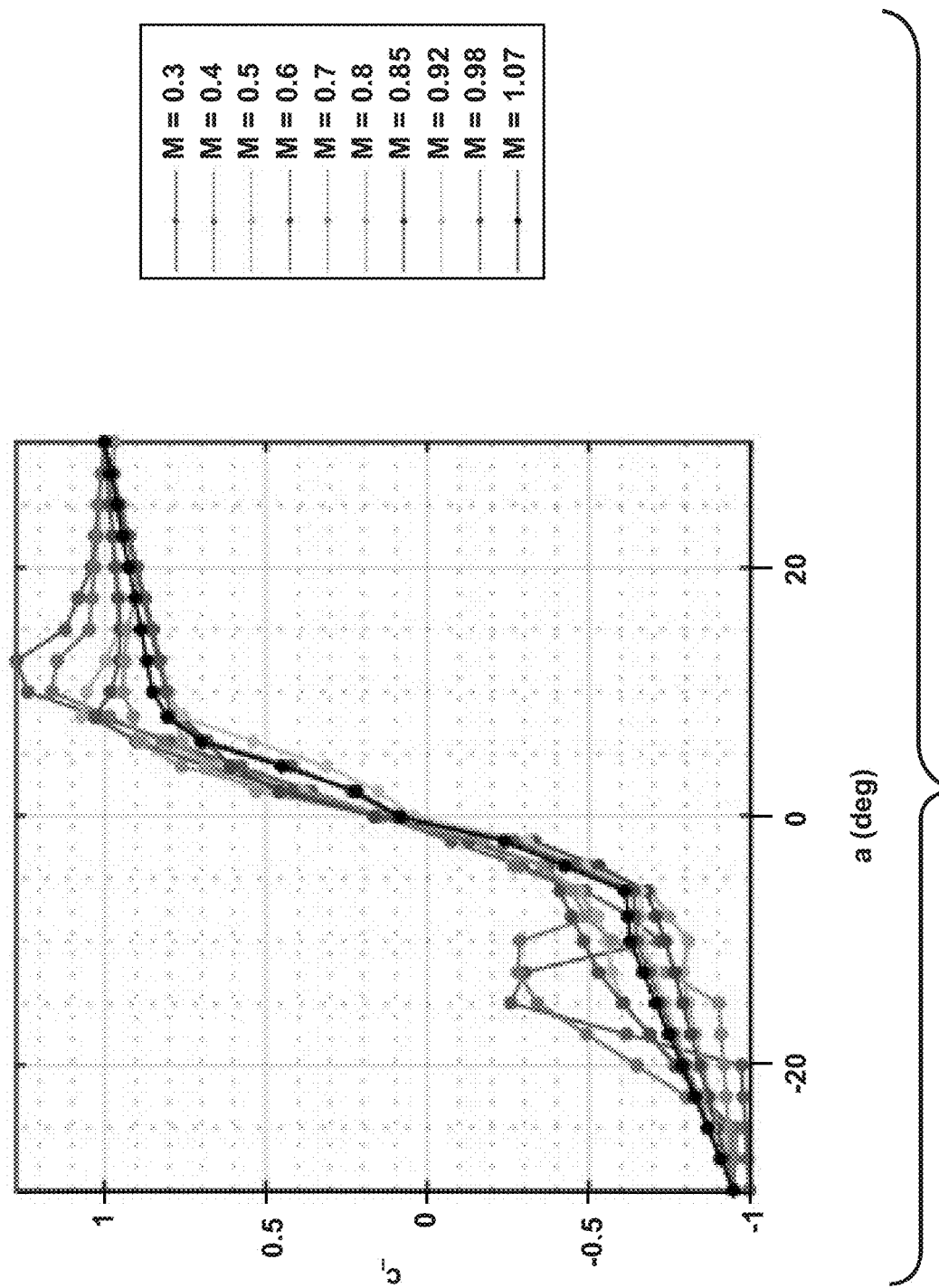
FIG. 14A comprises a chart showing airfoil (SSC-A409) over a range of alpha and Mach for section lift coefficient.
Figure 14B:
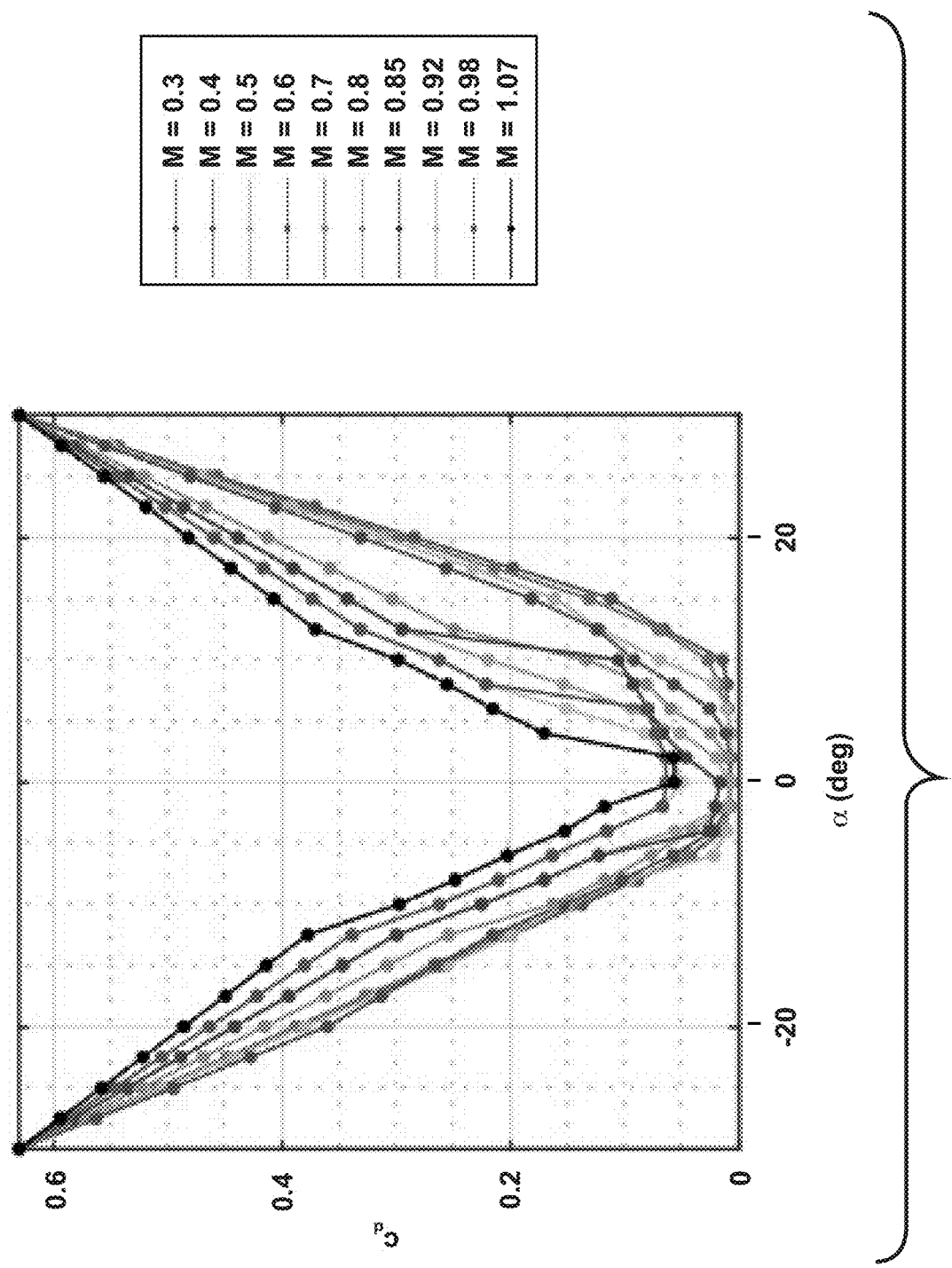
FIG. 14B comprises a chart showing airfoil (SSC-A409) over a range of alpha and Mach for section drag coefficient.
Figure 14C:
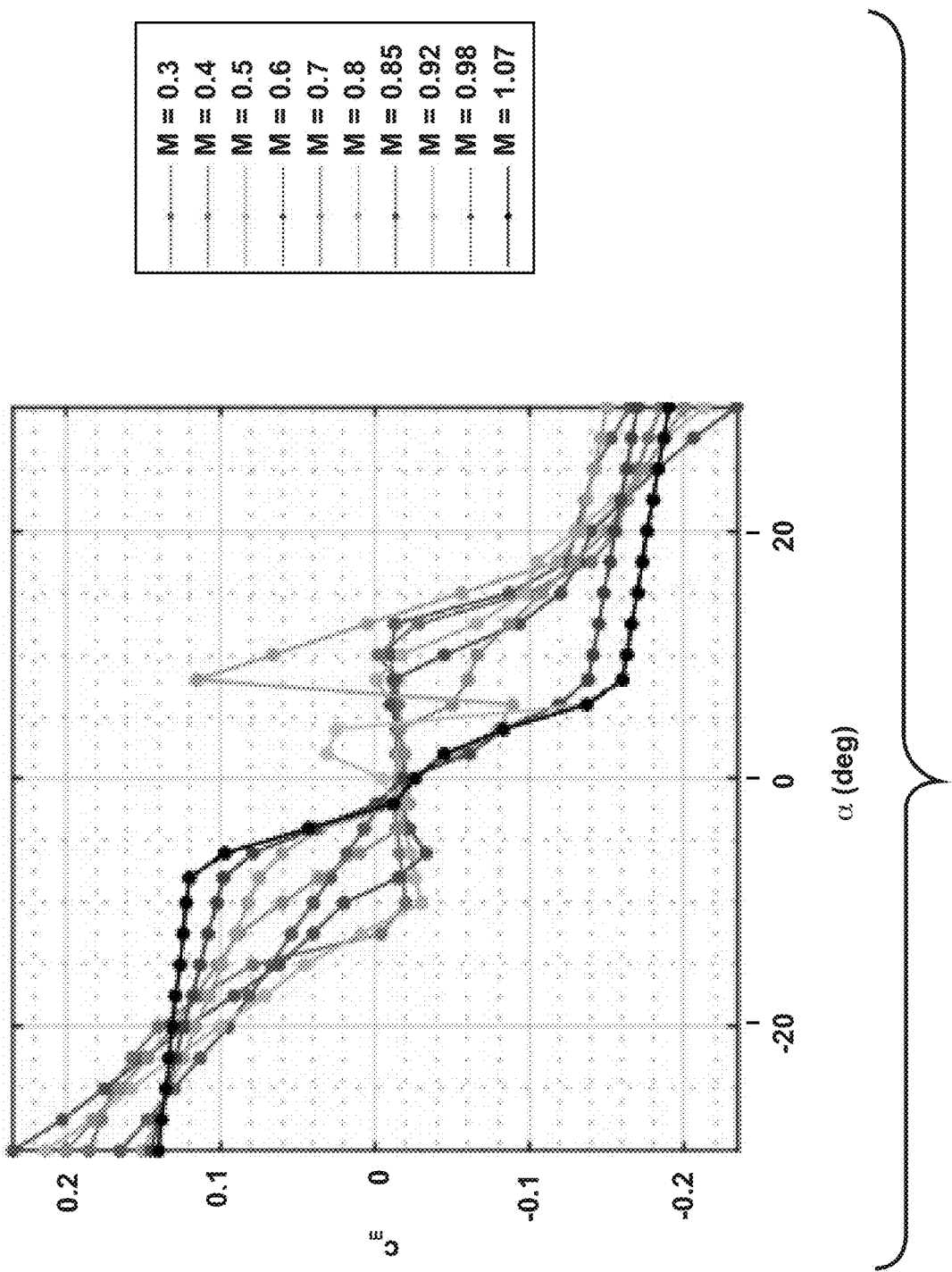
FIG. 14C comprises a chart showing airfoil (SSC-A409) over a range of alpha and Mach for section pitching coefficient.

Application of RAM-C to a well-known rotor airfoil (SSC-A09) highlights the accuracy and efficiency of a modeling process according to the present disclosure for a simplified modeling problem with very few factors but with significant nonlinearities requiring the splitting process to achieve adequate models. FIGS. 14A-C presents an example SSC-A09 database (color code on FIG. 14C). Variations in force and moment coefficients with Mach number and angle-of-attack illustrate the aerodynamic complexity possible even for cases with a limited number of factors.

To demonstrate RAM-C applied to this airfoil in a computational study, the factors or explanatory variables and their ranges of interest were chosen as shown in Table 3. CFD is used as the "test facility" in this case. Although this case involves very few factors, a RAM-C process (and code) according to the present disclosure can be utilized. The adjustment in the RAM process occurs in FCB (4) (FIG. 5), the Block Library, where the appropriate sequence of blocks is chosen to correspond to the number of factors required. In particular, for a two factor RAM process, generic test blocks configured for a two factor model are selected from the Block Library. For example, if a user inputs information to the code indicating that a design will have a two factor polynomial model, a set of five two factor blocks may be selected from the Bock Library by the RAM code.

TABLE 3

Factor Ranges for SSC-A09 Test

| # | Factor Label | Description | Range Low | Range High | Units |
|---|---|---|---|---|---|
| 1 | α | Angle of attack | −30 | 30 | deg |
| 2 | M | Mach | 0.3 | 1.1 | Non-dim |

Figure 15:
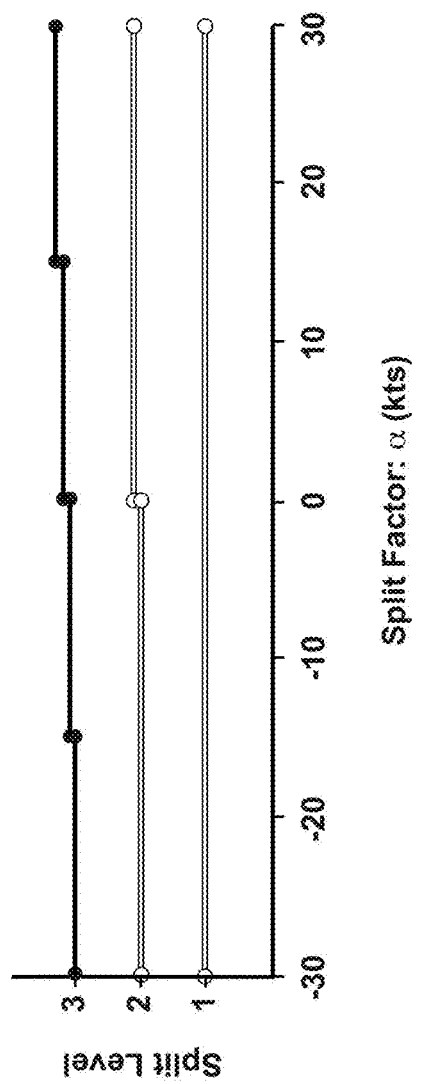
FIG. 15 is a chart showing a splitting process for a RAM airfoil (SSC-A09) study.

FIG. 15 characterizes the region splitting that enables a RAM-C process according to the present disclosure to achieve more accurate models and ultimately achieve the desired final PE metric value. Level 1 (L1) is the full range of interest and represents Region 1 (R1). In this example, a is chosen as the key variable for splitting and the split sub-regions are made without any overlap. The choice of splitting on more than one variable and intelligent, automated region splitting (rather than splitting regions in half) may be incorporated as options in a RAM-C process according to other aspects of the present disclosure. As shown in FIG. 15, each new level of splitting is labeled. After the first split of L1R1 into Level 2 (L2), two new sub-regions are produced, referred to as L2R2 and L2R3. For this example, satisfactory PE values (shown as green bars) were obtained using Level 3 (L3) splits.

Figure 16:
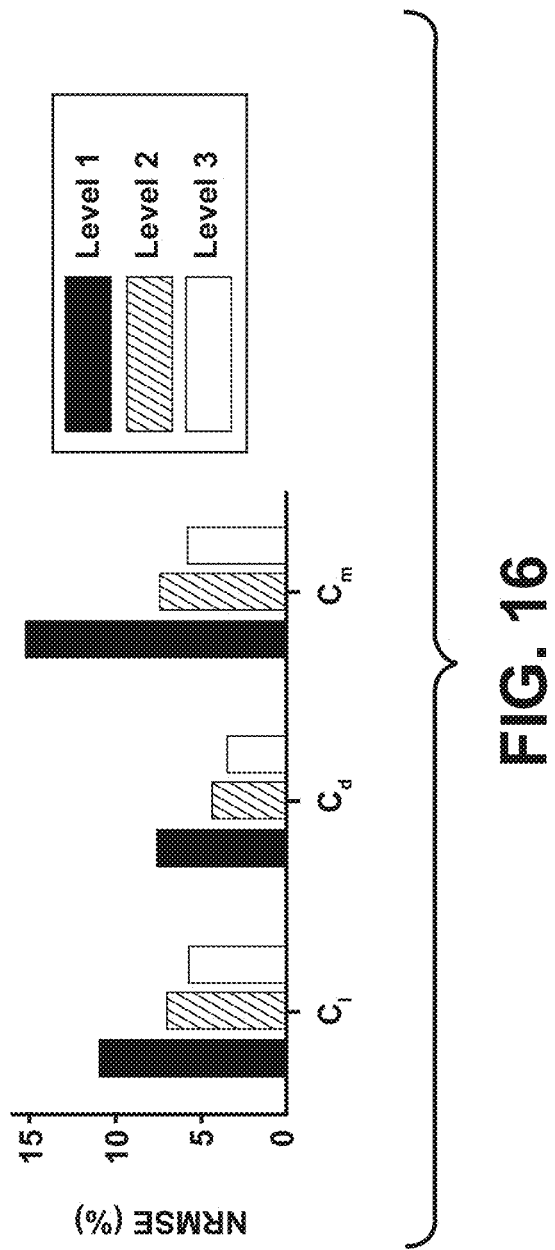
FIG. 16 is a chart showing PE metric progress for each level for airfoil (SSC-A09) study.
Figure 17:
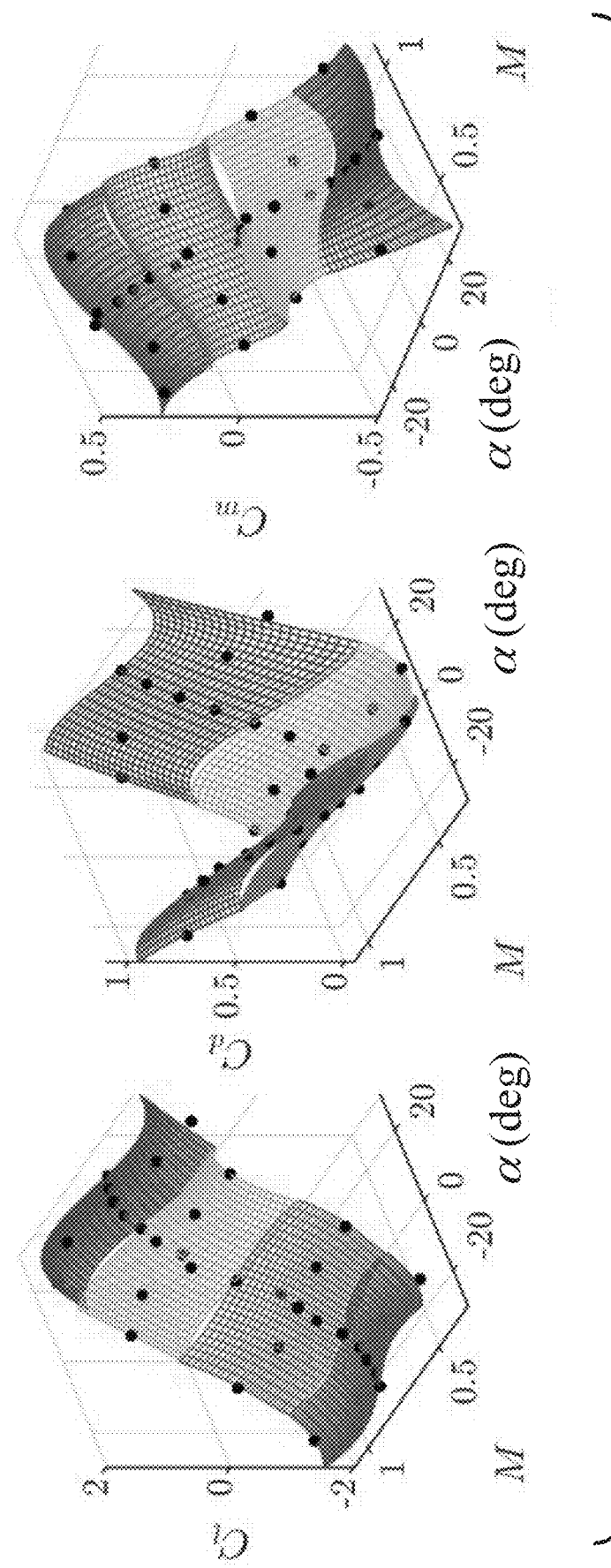
FIG. 17 is a chart showing aerodynamic coefficients for each sub-region for the SSC-A09 study.

FIG. 16 shows results of the modeling progress for each coefficient in terms of the PE metric. For computational studies with relatively few validation points (in this case only 15 validation points were computed in each sub-region), the PE metric is defined as the normalized root-mean-square error or NRMSE for validation data. Final models were considered satisfactory when the PE metric was either close to or below 5%. During the RAM modeling process for each sub-region, regression resulted in only cubic polynomials with 2-factor interactions required to satisfy the PE metric. FIG. 17 shows the resulting model surfaces for each sub-region. To help assess the quality of model fit, a limited amount of the "measured" data is shown as black dots; the dots represent data along the mid-range values for each factor within each sub-region. The last step in the RAM process is to blend the final sub-region models for each coefficient into global polynomial models useful for flight dynamics simulations.

Figure 18:
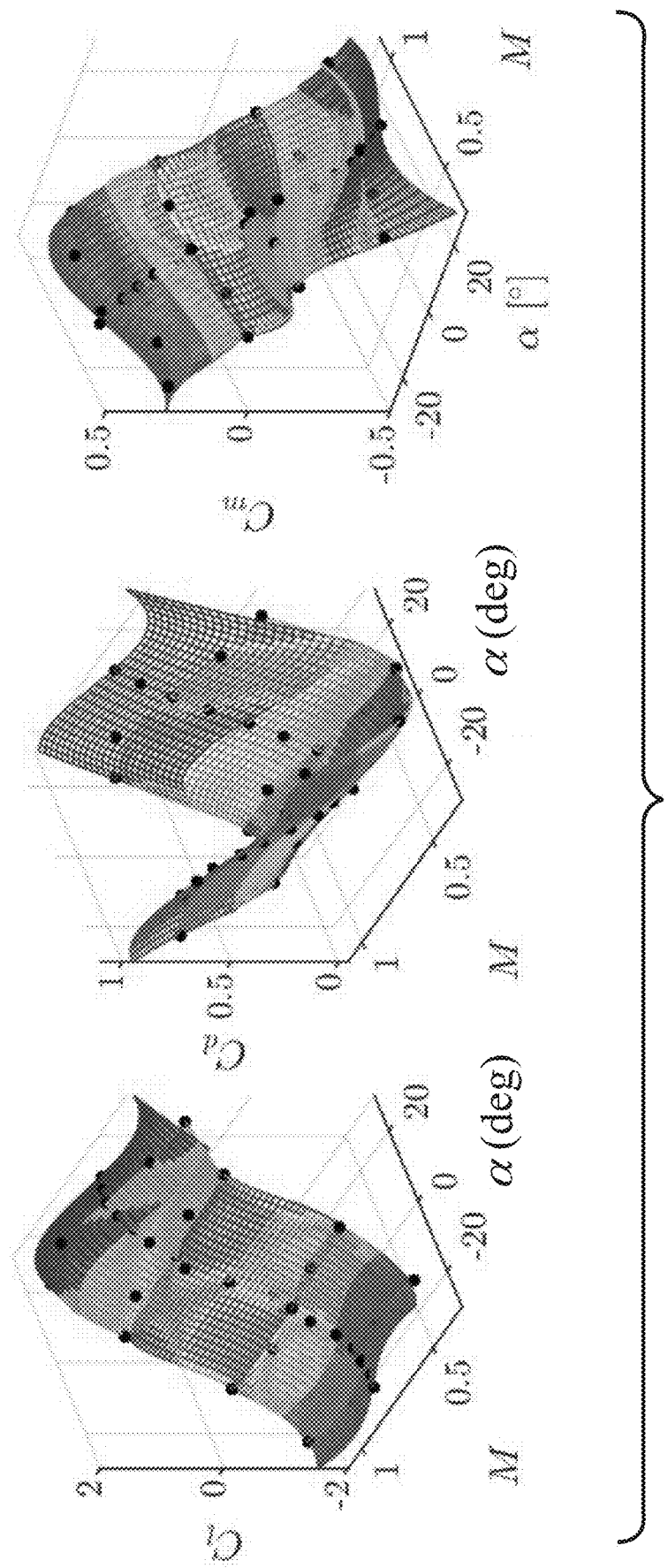
FIG. 18 is a chart showing aerodynamic coefficients for each sub-region after blending for SSC-A09 study.
Figure 19:
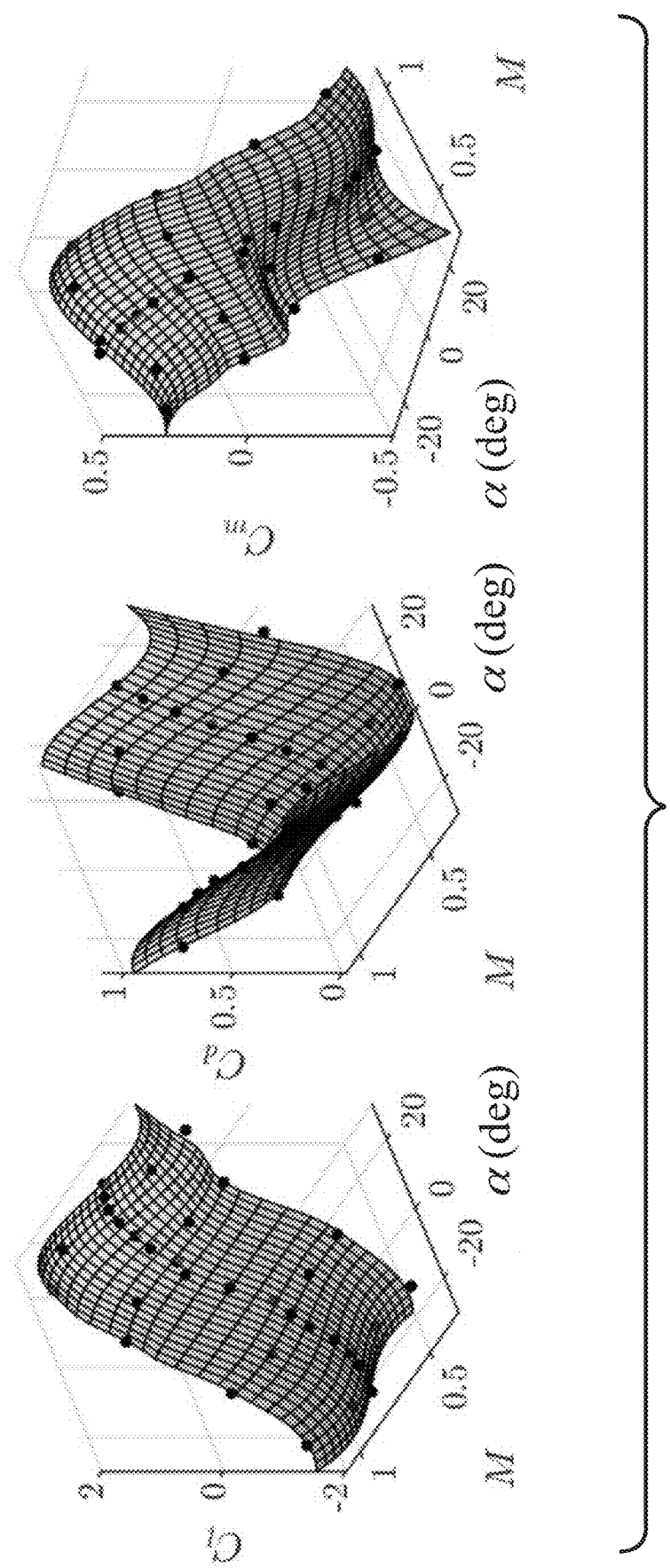
FIG. 19 shows final global aerodynamic coefficients for the SSC-A09 airfoil study.
Figure 20:
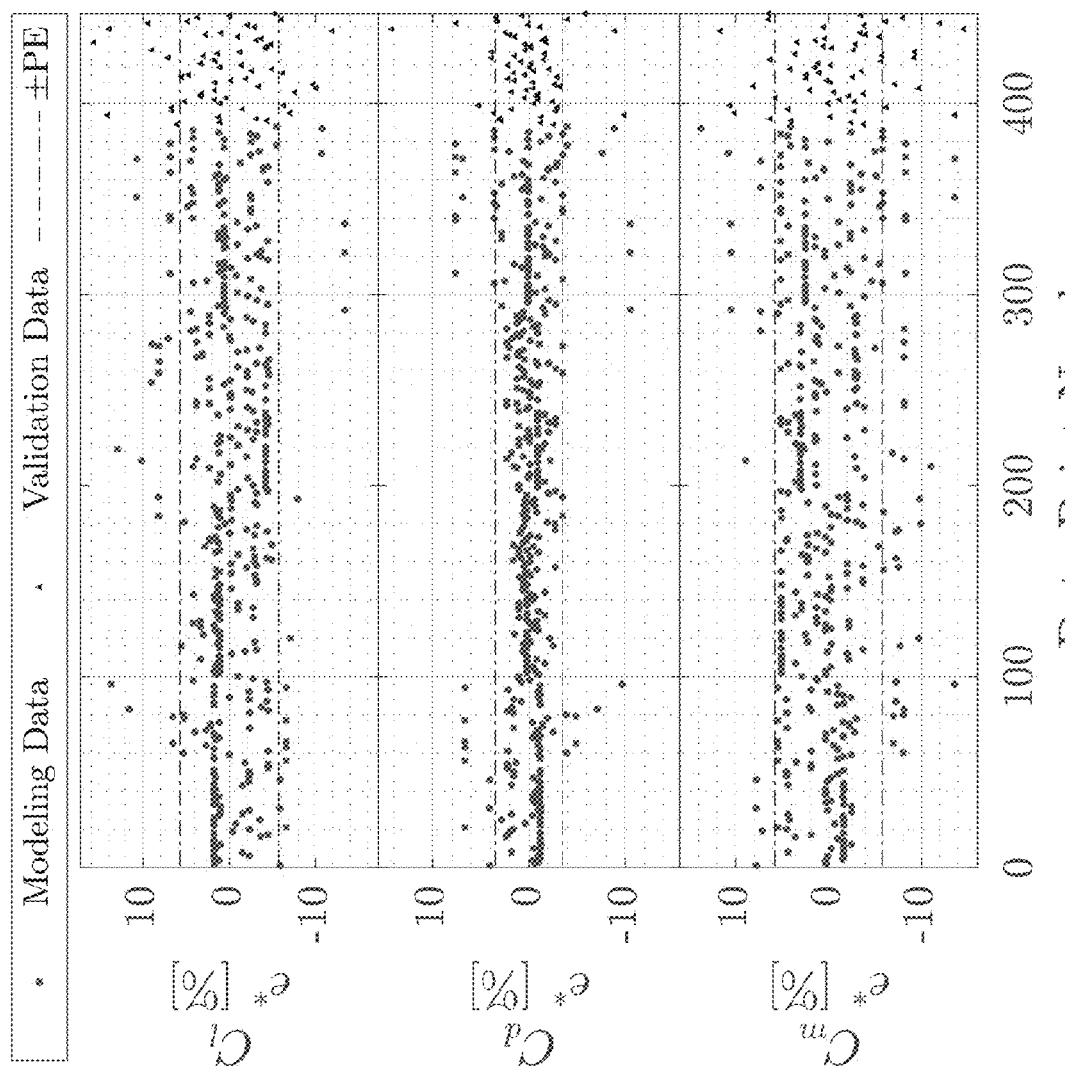
FIG. 20 shows residuals for SSC-A09 airfoil based on the final global model.

Additional model fits used for blending each coefficient as shown in FIG. 18 and FIG. 19 shows the final global response surface model presented with color coding based on coefficient magnitude. A final check on residuals for the global models is given in FIG. 20, where the blue dots are residual data points covering all the final four sub-regions and the small black triangles are all the validation test points. The residuals generally are satisfactory; however, the $C_d$ residuals reveal less desirable behavior when comparing the middle two regions (100<data points <300) with those outside that range. The outside regions include the highest angles of attack where fitting the data is more difficult and where unsteady behavior of the aerodynamics is more difficult to capture in CFD simulations.

Lift+Cruise (L+C) Example

Figure 21:
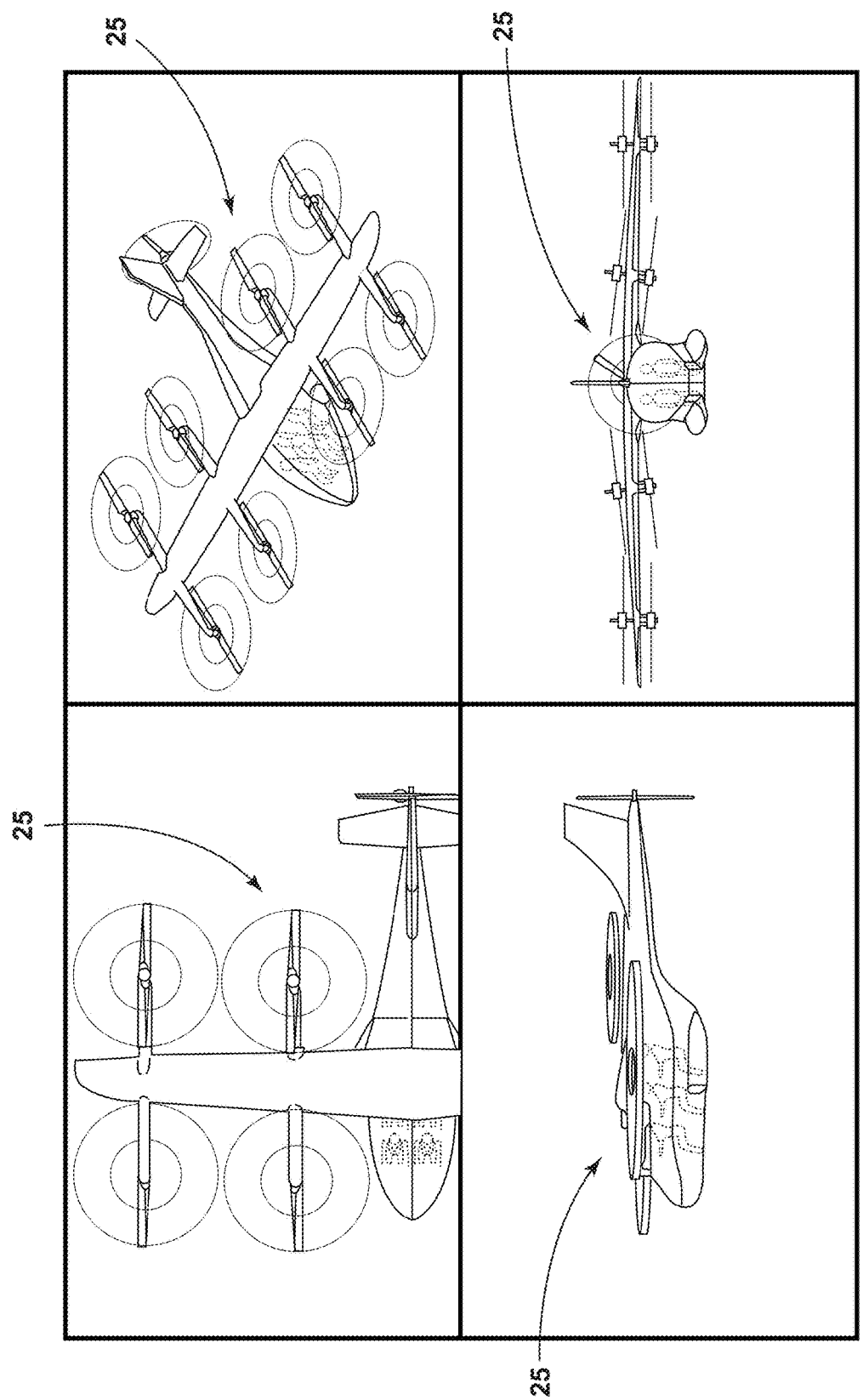
FIG. 21 shows Lift+Cruise (L+C) vehicle geometry.
Figure 22:
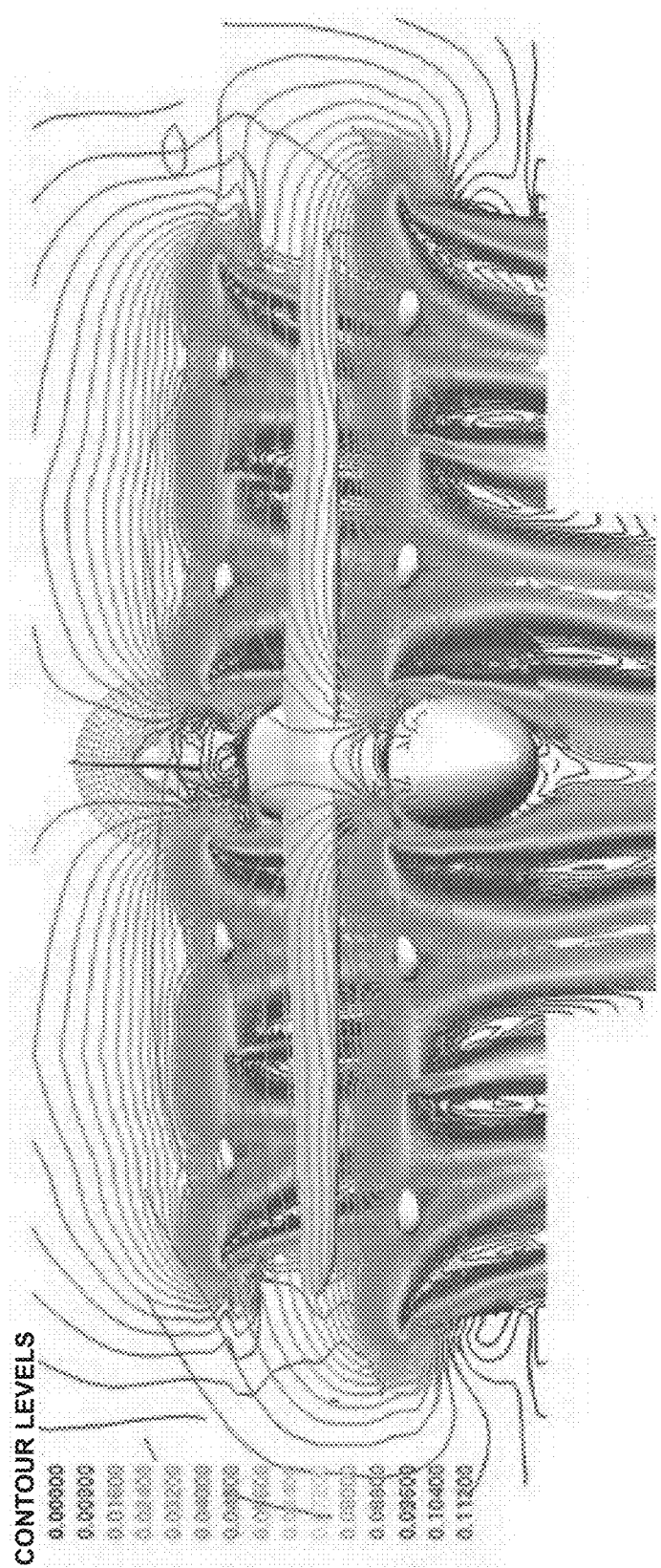
FIG. 22 shows L+C velocity contours in simulated hover.

Application of a fully automated RAM-C process according to one aspect of the present disclosure is demonstrated by application to a complex configuration called "Lift+ Cruise" (L+C), shown in FIG. 3 and again in FIG. 21 with more geometry details. The L+C configuration is provided to show application of a RAM-C process to a complex, rotor-dominated vehicle as well as an application using a high-fidelity computational code in a static test environment. An example simulation of L+C in a steady vertical-flight condition using the NASA OVERFLOW CFD code is shown in FIG. 22. In this case, the vehicle is operating at 6000 ft. with only the lift rotors running at mid-rpm. For demonstration of a RAM-C process according to one aspect of the present disclosure, the transition modeling range is studied since it presents a challenging region to model with all propulsion and control surfaces operating.

Figure 23:
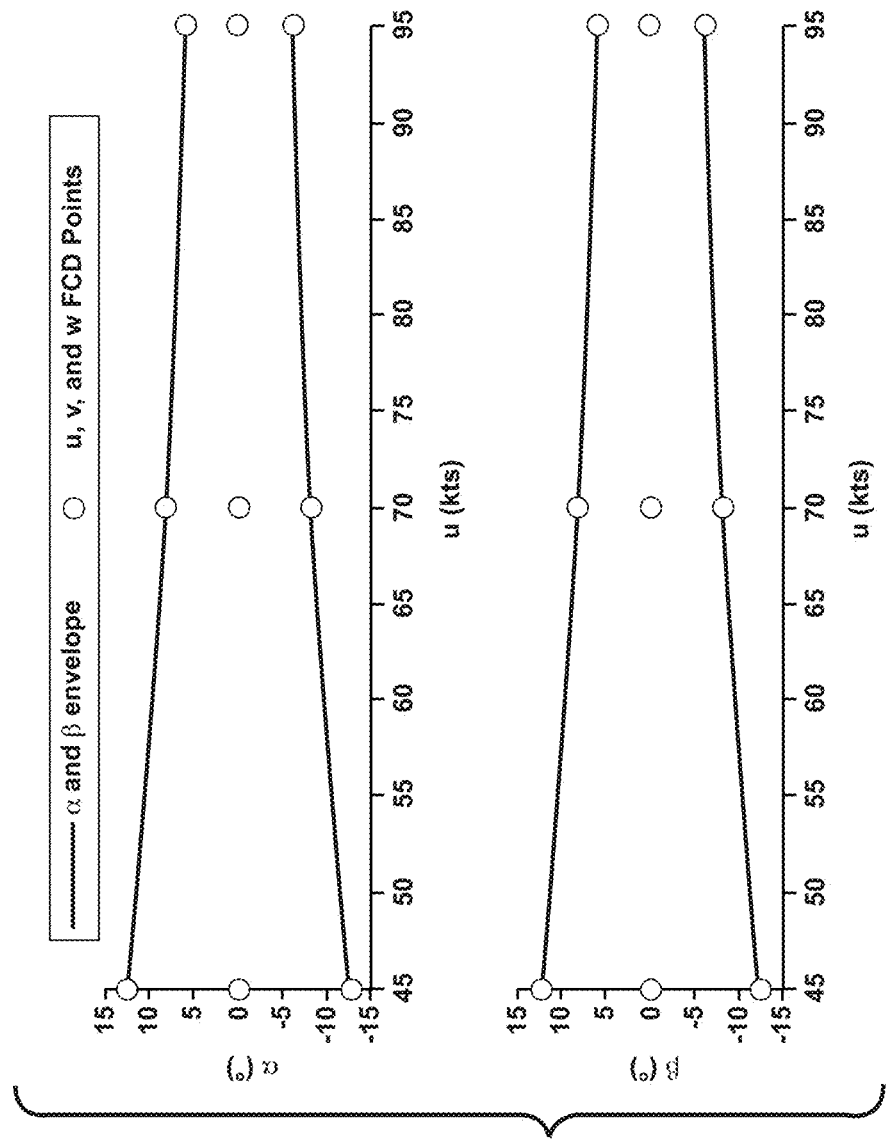
FIG. 23 shows angle of attack and sideslip envelopes for L+C transition study.

Table 1 provides a list of the 17 factors considered for the L+C transition example case. Modeling hybrid aircraft-rotorcraft vehicles is more practically accomplished using body-axis velocities (u, v, w) rather than velocity magnitude, angle-of-attack and sideslip angle (V, α, β). This is because at very low speeds the vehicle may fly at angles-of-attack and sideslip angles from −180 to +180 degrees, while at higher speeds the angle-of-attack and sideslip angles of interest are much more limited (FIG. 23). For this type of vehicle (u, v, w) can be used to define fixed ranges for the independent variables while covering angle-of-attack and sideslip angle ranges of interest. For output variables, the use of dimensional forces and moments relieves the quandary of defining a consistent force and moment coefficient non-dimensionalization applicable to forward flight and hover, as well as multiple rotors operating at varying rpm. From a modeling perspective, it is important to note that both choices impact the form of the response surface and the ability of a polynomial-based model to fit that surface. In these simulations the eight rotors ($n_1$-$n_8$) and the pusher prop ($n_9$) are all modeled as fixed-pitch blades and with rpm control between representative values for idle and maximum rpm.

Figure 24:
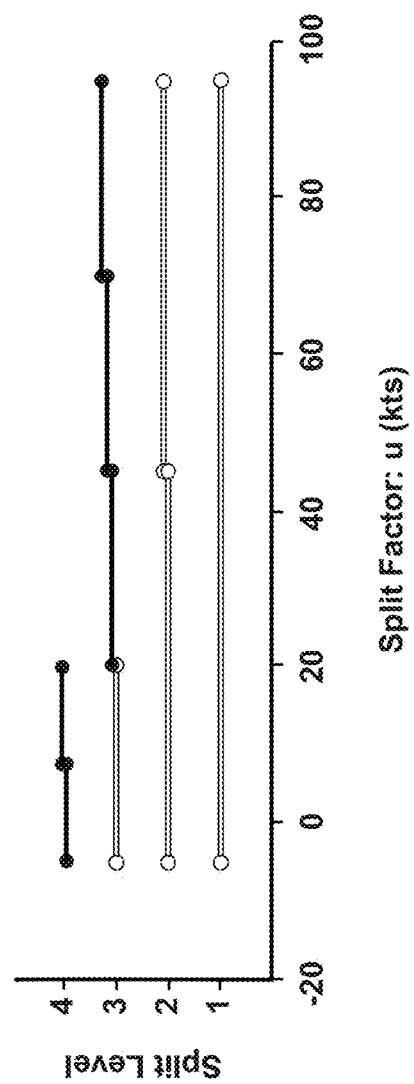
FIG. 24 shows RAM splitting process for L+C transition study.

FIG. 24 shows the region splits resulting from RAM-C applied to the L+C modeling study. Since a large range of forward velocity was initially addressed, four levels of splitting (producing five sub-regions) was required to obtain satisfactory PE metric values. In this example, splitting was performed on body-axis velocity, u, and sub-regions were developed with 0% overlap. As shown in FIG. 24, at Level 4, only the lowest speed region required an additional split before the final models were deemed to satisfy fidelity requirements. In this example, polynomial models were estimated only up to quadratic terms plus 2-factor interactions.

Figure 25:
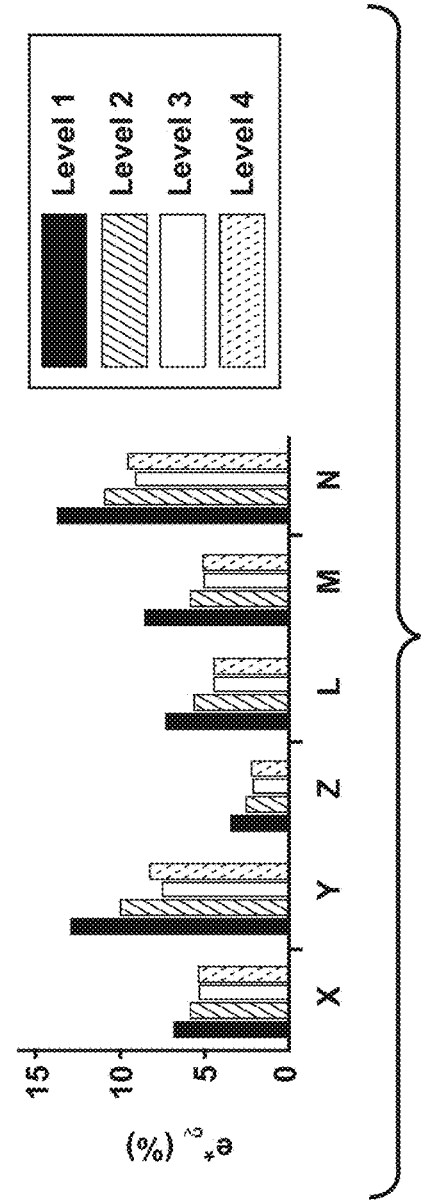
FIG. 25 shows PE metric at each split level for L-C transition study.

FIG. 25 shows the PE metric, in this example $e^*_{cv}$, achieved at each split level. These values generally improved moving from L1 down to L3 but adding L4 at very low speeds only helped axial force, X, and provided neutral benefit to Z, L, and M. For side force, Y, and yawing moment, N, PE values were slightly increased. In general, further improvement of the PE values can be accomplished with additional splitting or allowing higher-order polynomials. Engineering judgement can determine the practical limits on the number of splits that make sense. The last split for L4, added more validation points at very low speeds where the data presented much more variability making model prediction much more difficult. The increased variability in the computational data is shown in FIG. 29.

Figure 26A:
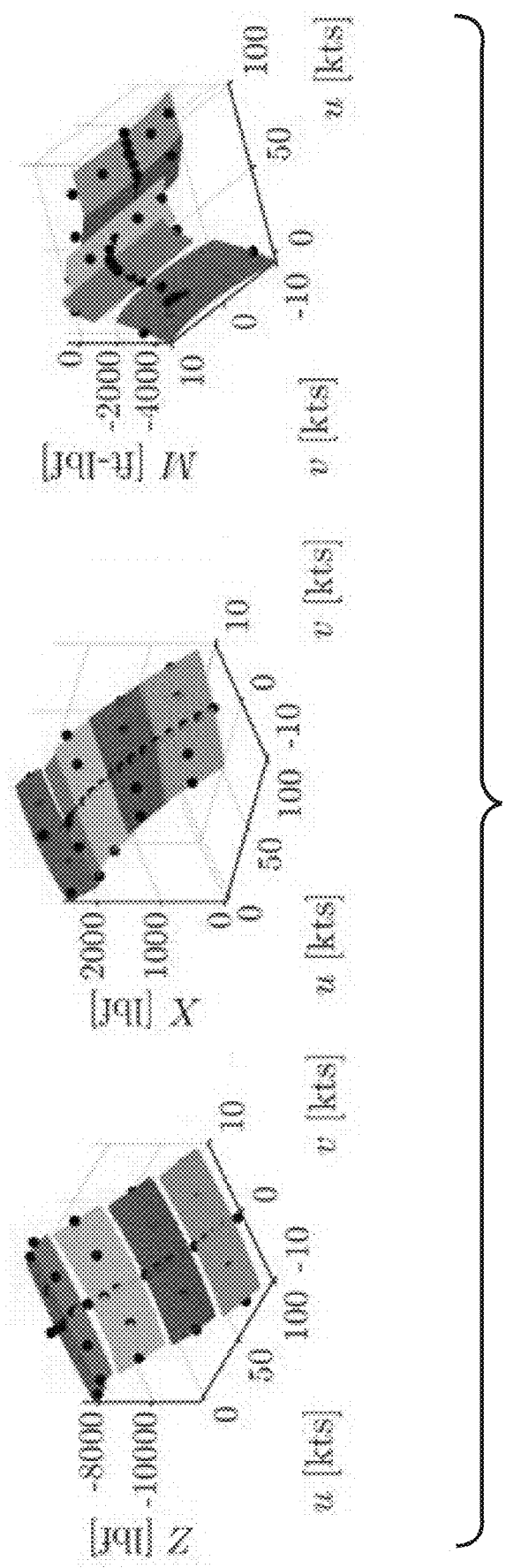
FIG. 26A shows longitudinal response models for separate regions versus (u, v)
Figure 26B:
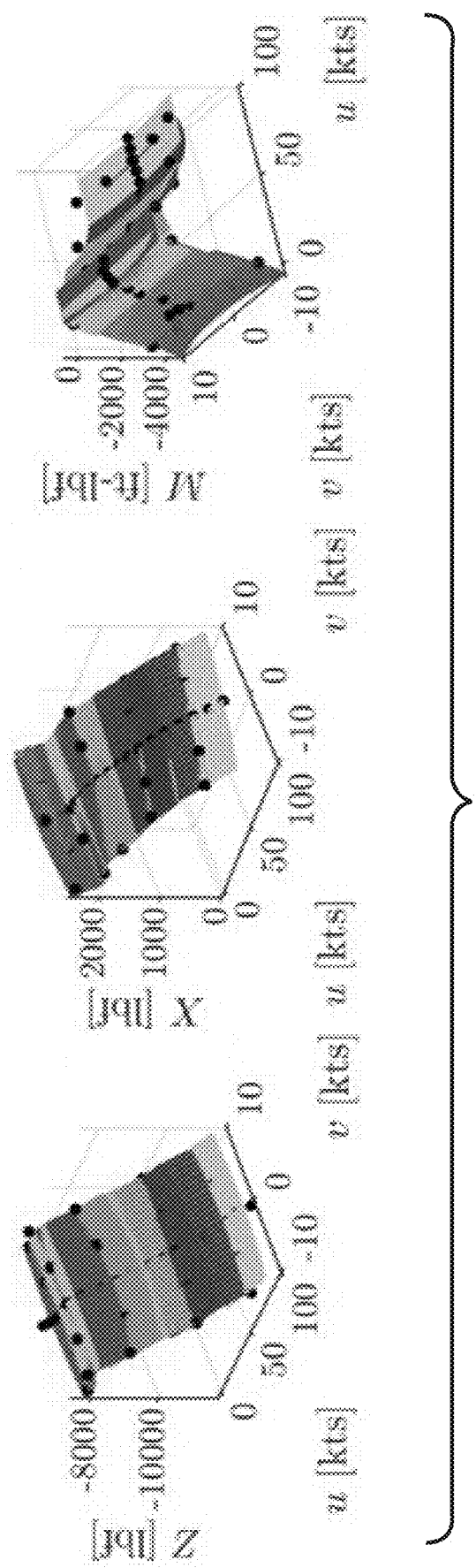
FIG. 26B shows longitudinal response models for blended regions versus (u, v)
Figure 27A:
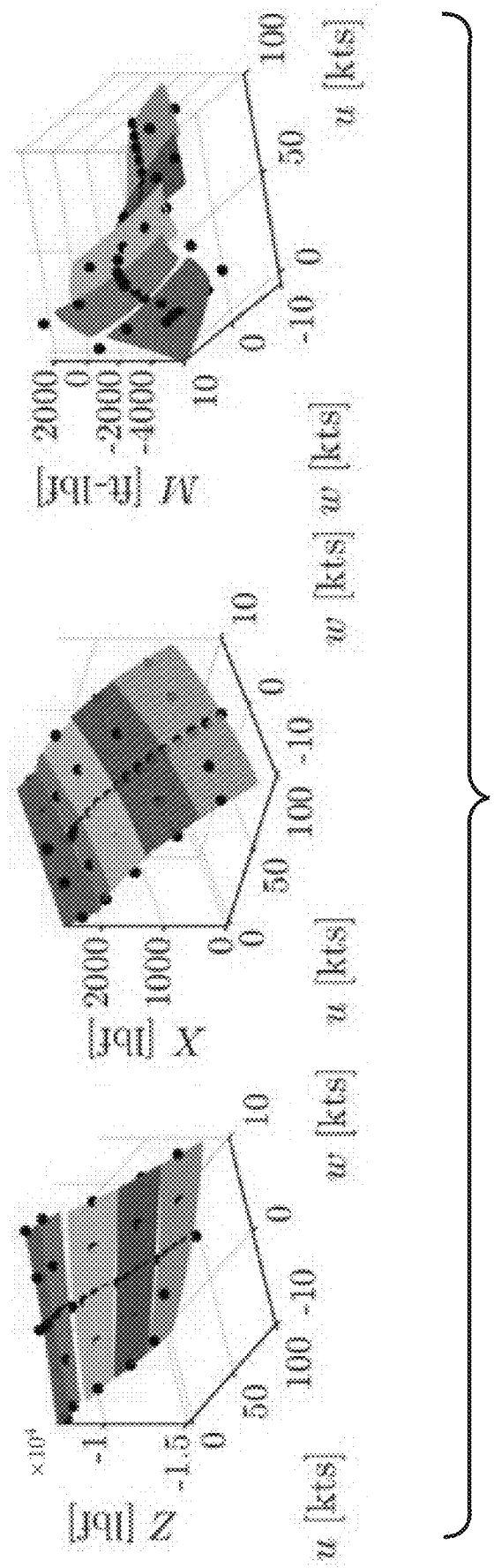
FIG. 27A shows longitudinal response models for separate regions versus (u, w)
Figure 27B:
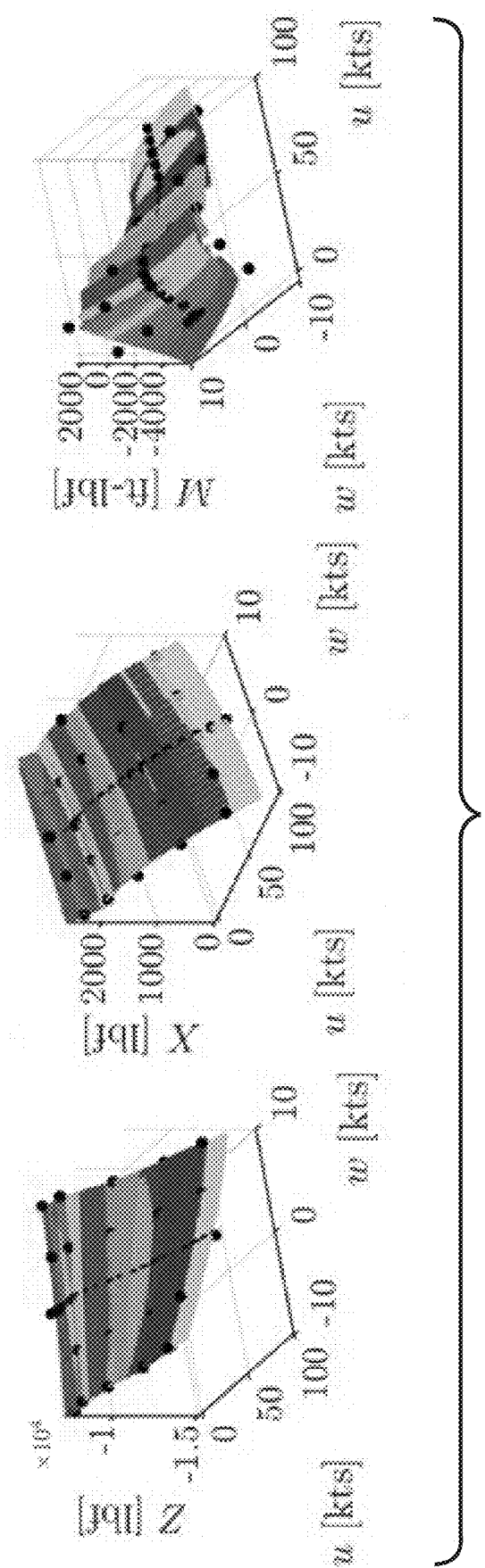
FIG. 27B shows longitudinal response models for blended regions versus (u, w)

FIGS. 26A and 27A show example results for the longitudinal model surfaces for each sub-region as functions of (u, v) and (u, w), respectively. FIGS. 26B and 27B show the same model surfaces with the additional blending models also displayed. "Measured" data, selected along factor mid-range values, are shown as black dots.

Figure 28:
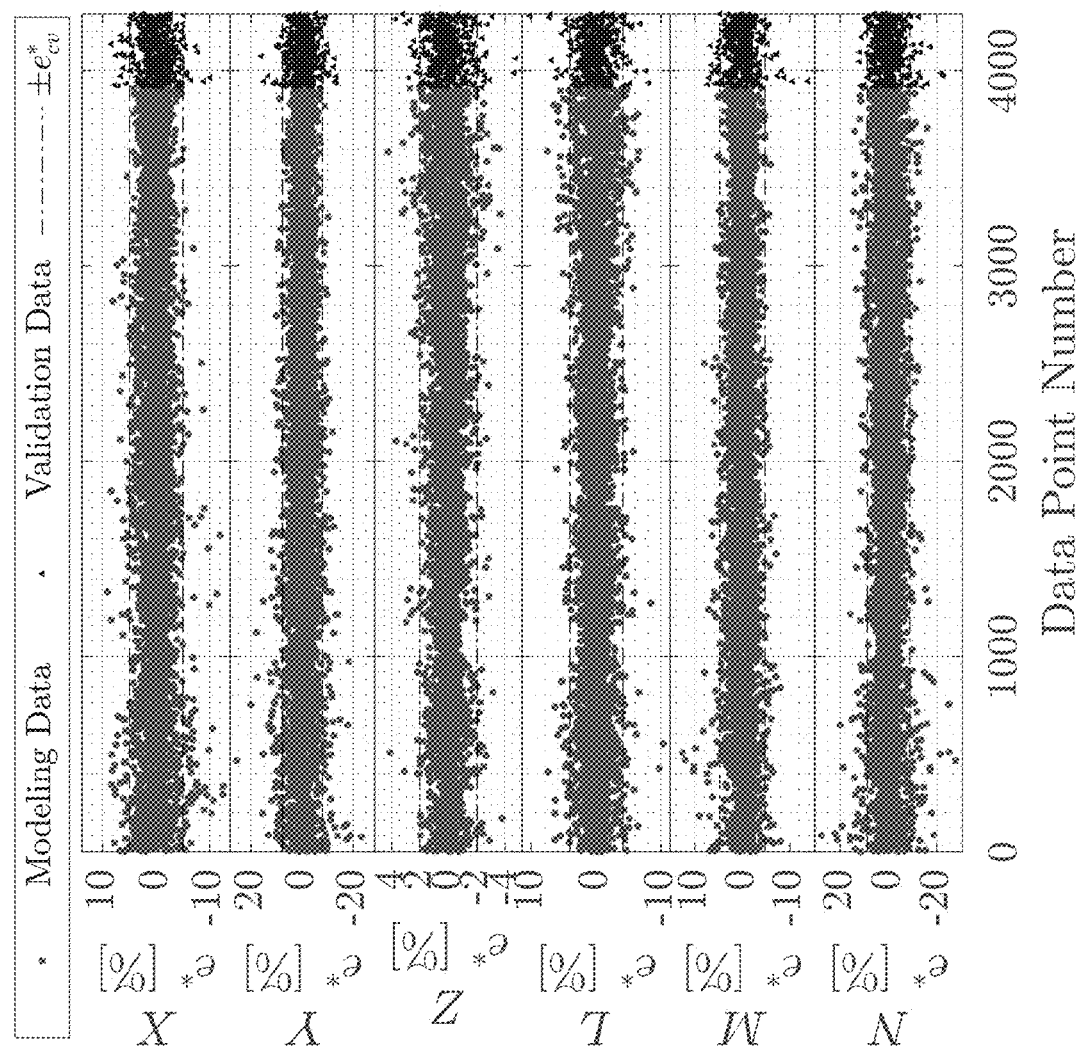
FIG. 28 shows residual plots for final coefficient models.

Model residuals normalized by the response global maximum absolute value are shown in FIG. 28. These residuals generally indicate satisfactory modeling results. Blue dots represent normalized residuals from model estimation data and black triangles are normalized residuals from validation data.

Figure 29:
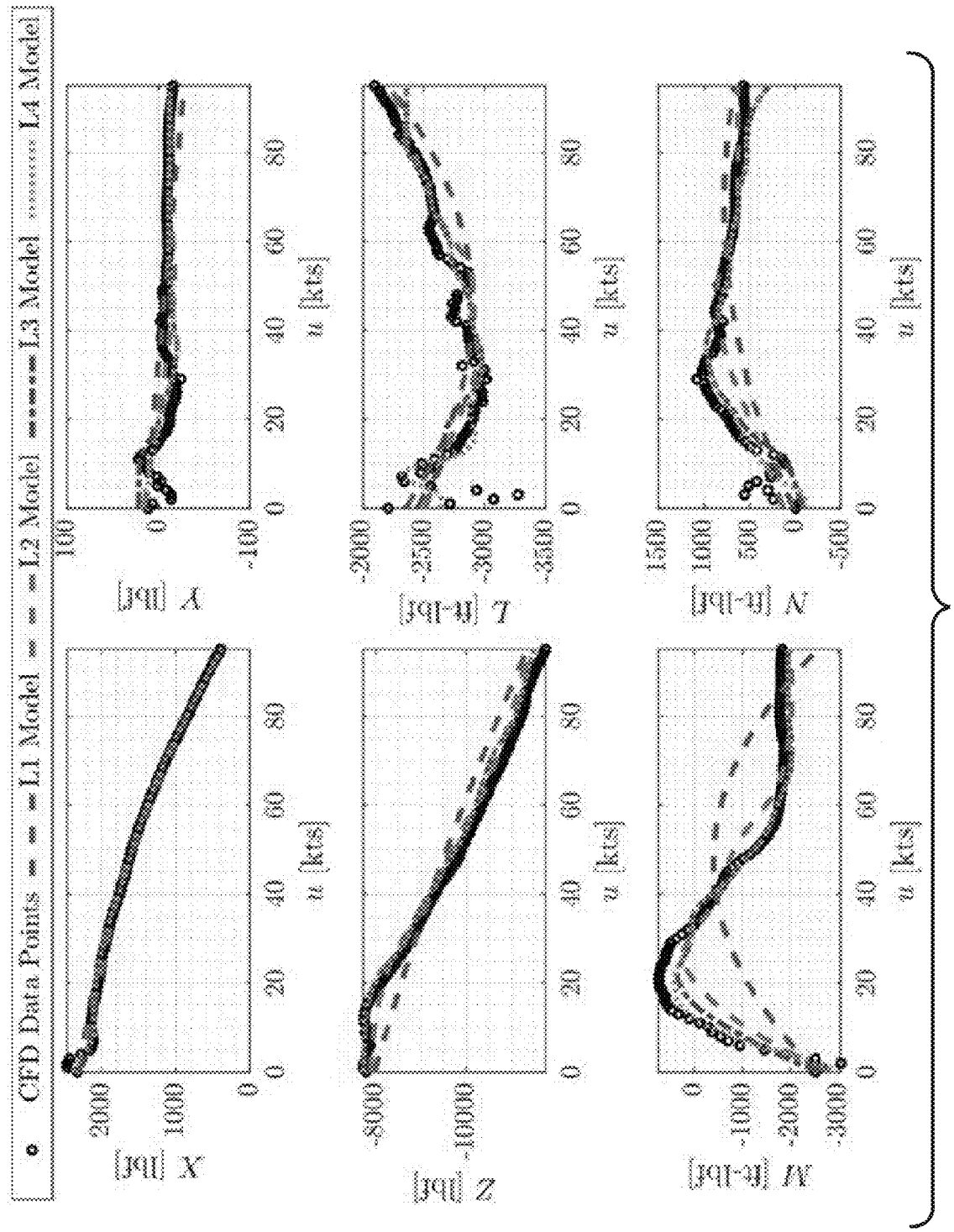
FIG. 29 shows progression of response models at each level compared to OFAT data.
Figure 30A:
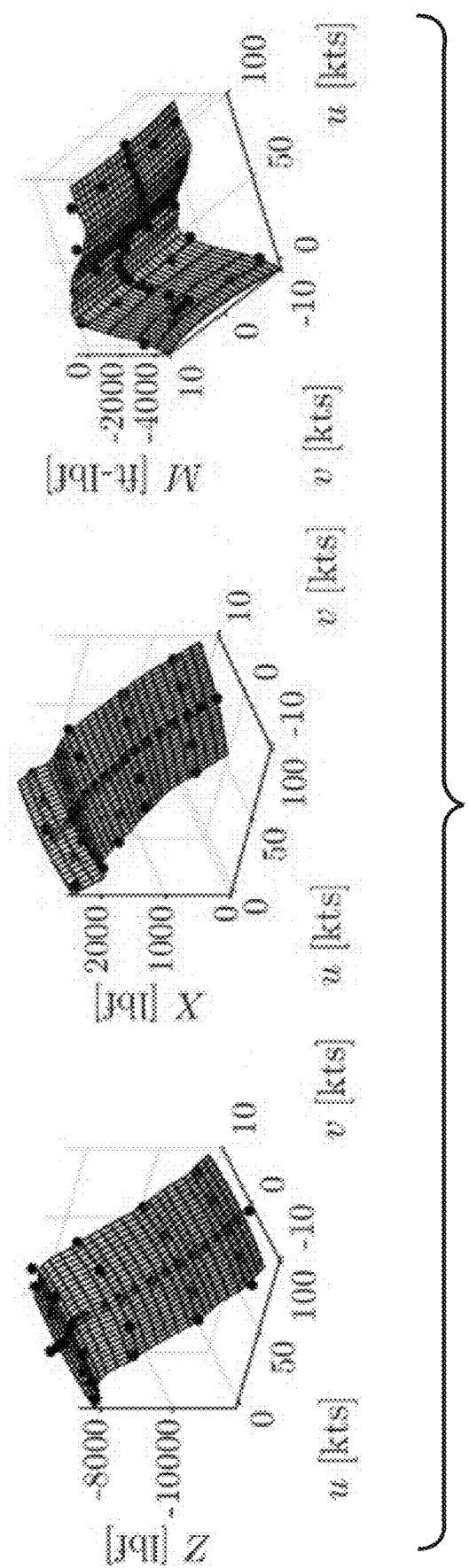
FIG. 30A shows final global longitudinal response models as function of (u, v)
Figure 30B:
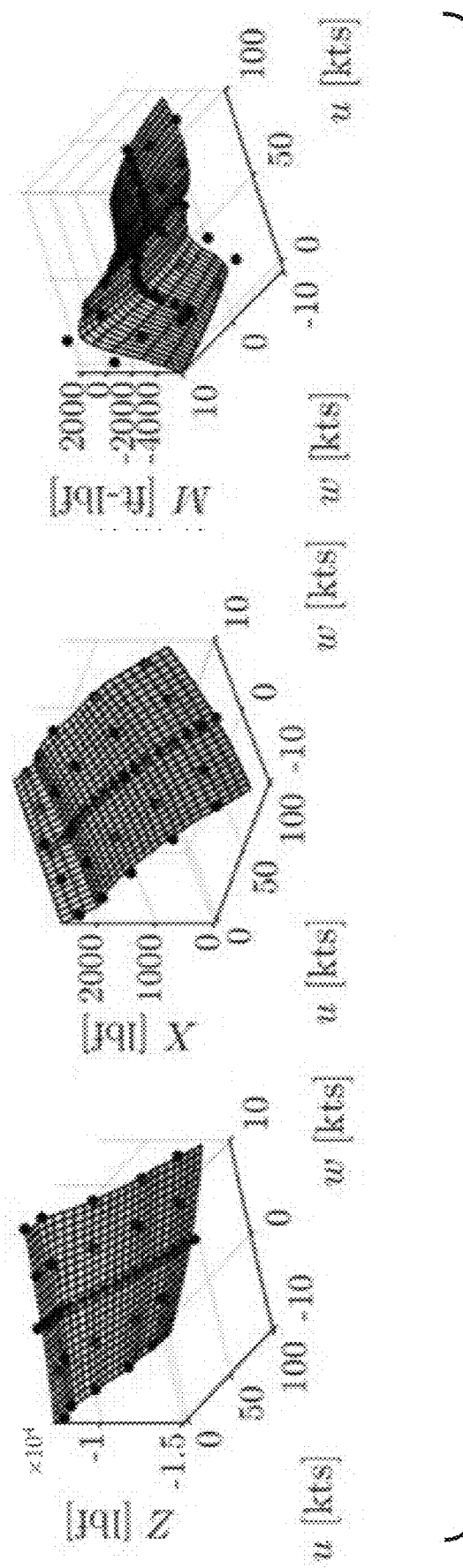
FIG. 30B shows final global longitudinal response models as function of (u, w).

Effectiveness of the modeling progression can also be seen in FIG. 29, where model responses are plotted against one-factor-at-a-time (OFAT) data. In this figure, all factors are fixed at their mid-range values in the model while the model responses can vary with body-axis velocity u. Plots for pitching moment, M, demonstrate the effective progression toward a good fit, where it can be observed that as model level increases, the response prediction significantly improves compared to the OFAT data. The roll moment, L, highlights some of the variability of the underlying data, particularly at very low speeds. SME judgement, in this case, would deem further splitting unnecessary and the models satisfactory. FIGS. 30A and 30B highlight examples of the longitudinal final blended global model response surfaces, as functions of (u, v) and (u, w), respectively, with color coding based on coefficient magnitude.

A RAM-C process according to one aspect of the present disclosure provides an approach to testing and modeling that guides the process in a more automated, efficient, and statistically rigorous fashion. As discussed above, a RAM-C process according to the present application may be utilized in numerous applications, including a rotorcraft airfoil and a complex eVTOL design. Designed experiments according to one aspect of the present disclosure (based on DOE/RSM), contained in an automated RAM-C process according to the present disclosure demonstrate that a method can provide statistical information before, during, and after the experiment is completed. A RAM-C process according to the present disclosure permits achieving a specific desired level of model fidelity when working with high-fidelity computational codes. The sequential nature of a general RAM approach according to the present disclosure may also limit data collection to that required to match model complexity and fidelity requirements. In addition, for typical eVTOL vehicles where the number of factors may be 3-5 times that of a conventional aircraft, an automated RAM-C approach according to the present disclosure may provide guidance starting with experiment design, through test execution, and in final model analysis. The examples discussed in more detail above demonstrated that an automated modeling process according to the present disclosure can be utilized for static aerodynamic testing in a computational environment. A RAM process according to the present disclosure may be utilized to guide a wide spectrum of complex testing and modeling problems involving complex vehicle designs.

The present disclosure is not limited to aerodynamic models, but rather could be utilized to develop polynomial models for a wide range of applications. Examples include watercraft (e.g., ships, submarines), vehicles, and biological systems, etc. The process of the present disclosure may be utilized in connection with virtually any item or system capable of being described by a mathematical model describing the relationship between various factors and associated responses.

What is claimed is:

1. A computer-implemented method of creating a polynomial aerodynamic model that predicts forces on an aerodynamic body corresponding to the polynomial aerodynamic model, the method comprising:

determining fidelity criteria for an aerodynamic model, wherein the fidelity criteria comprise a plurality of maximum allowable prediction errors;

causing a computer program to form validation data utilizing selected factors that vary during flight;

a) causing the computer program to form a series of sequential scalar test blocks utilizing selected factors that vary during flight and predefined sequential non-scalar test blocks stored in a library, wherein at least some of the factors comprise ranges that are capable of being split, wherein the series of sequential scalar test blocks correspond to aerodynamic models having increasing order;

b) applying the series of sequential scalar test blocks to a computational fluid dynamics (CFD) program to produce response data;

c) estimating an aerodynamic model utilizing the response data, wherein the aerodynamic model comprises a plurality of aerodynamic polynomials;

d) utilizing predefined prediction error criteria and the validation data to determine if an aerodynamic model estimated from the response data satisfies pass-fail validation criteria;

if the aerodynamic model does not satisfy the pass-fail criteria, repeating steps a)-d) utilizing scalar test blocks of increasing order until a last sequential scalar test block has been used, followed by splitting one or more factors to form at least one test region if the pass-fail criteria is not satisfied using the last sequential scalar test block followed by repeating steps a)-d) utilizing at least one test sub-region; and e) applying the aerodynamic model satisfying the pass-fail validation criteria to an aerodynamic vehicle in a wind tunnel, a simulation study, a real-time simulation, or a design process.

2. The method of claim 1, wherein:
a first predefined sequential non-scalar test block comprises a face-centered central composite design in two-factor space;
a second predefined sequential non-scalar test block comprises a nested face-centered design in two-factor space; and including:
causing the computer program to form first and second scalar test blocks based on the first and second predefined sequential non-scalar test blocks and the selected factors.

3. The method of claim 2, wherein:
a third predefined sequential non-scalar test block comprises an I-optimal design that minimizes prediction error for quadratic models; and including:
causing the computer program to form a third scalar test block based on the third predefined sequential non-scalar test block and the selected factors.

4. The method of claim 3, wherein:
a fourth predefined sequential non-scalar test block comprises either a Latin Hypercube (SFLH) design that evenly distributes test points over an entire test space defined by the factors; or an I-optimal design that minimizes prediction error for up to cubic models; and including:
causing the computer program to form a fourth scalar test block based on the fourth predefined sequential non-scalar test block and the selected factors.

5. The method of claim 1, wherein:
the predefined sequential non-scalar test blocks are sealed between −1 and +1 to allow factor ranges to be adjusted for new test regions and sub-regions.

6. The method of claim 5, wherein:
the computer code accesses a block library comprising 5-block sets that provide a plurality of sequences of pre-designed non-scalar test blocks, wherein each sequence is designed for a different number of factors; and wherein:
a first non-scalar test block comprises a face-centered central composite design;
a second non-scalar test block comprises a nested face-centered design;
a third non-scalar test block comprises an I-optimal block suitable for quadratic models plus 2-factor interactions and to minimize prediction errors;
a fourth non-scalar test block comprises an I-optimal block suitable for cubic plus 3-factor interaction models and to minimize prediction errors;
a fifth non-scalar test block comprises an I-optimal block suitable for validation data; and wherein:
steps a)-d) are repeated using the same 5-block sequence adjusted to the new sub-regions.

7. The method of claim 1, wherein:
the test blocks are selected to provide at least a predefined minimum confidence level, a minimum signal/noise ratio of the CFD output data, and a minimum required level of response detection of the CFD output data.

8. The method of claim 1, including:
a second sequential test block comprises a nested FCD design that is adequate for up to cubic polynomial models;
after adding the second sequential test block, updating and testing the aerodynamic polynomials against the validation data;
if the aerodynamic polynomials do not satisfy the pass-fail criteria, adding the next scalar test block to allow a more complex model;
modifying at least one test region after steps a)-d) are repeated using the full sequence of 5 scalar test blocks.

9. The method of claim 1, wherein:
a third non-scalar test block comprises an I-optimal design that minimizes prediction error for basic cubic or quadratic plus 2-factor interaction models;
after running the CFD program on the third non-scalar test block, updating the aerodynamic polynomials;
followed by testing the aerodynamic polynomials against the validation data; and
if the pass-fail criteria is not satisfied, then utilize the next scalar test block in the CFD program to allow a more complex model.

10. The method of claim 9, wherein:
a fourth scalar test block comprises an I-optimal design that minimizes prediction error for cubic plus 3-factor interaction models;
the validation data is formed using a fifth scalar test block;
after running the CFD program on the third scalar test block, the aerodynamic polynomials are updated and the aerodynamic polynomials are tested against the validation data;
if the pass-fail criteria is not satisfied, then utilize the next scalar test block in the CFD program; and including:
modifying at least one test region after using the full sequence of 5 data blocks.

11. The method of claim 1, wherein:
a validation test block is formed using an I-optimal design or a Latin Hypercube (SFLH) design to generate a validation test block for a CFD program; and including:
applying the validation test block to the CFD program.

12. The method of claim 1, wherein:
the pass-fail criteria comprises a predefined level of acceptable prediction error in the aerodynamic models based on CFD response data.

13. The method of claim 1, wherein:
a set of statistical design metrics is utilized to form the series of non-scalar test blocks, wherein the design metric is selected from the group consisting of variance inflation factor (VIF), Fraction of Design Space (FDS), and experimental power, and wherein the experimental power comprises a probability that a selected factor is significant according to predefined criteria.

14. The method of claim 1, wherein:
one or more factors are split only if the aerodynamic polynomial model response data does not satisfy the pass-fail criteria after a last test block in the series is used in steps a) -d).

15. A computer-implemented method of creating a polynomial aerodynamic model of a vehicle, the method comprising:
inputting fidelity criteria into a computer program, the fidelity criteria comprising a plurality of maximum allowable prediction errors;
inputting ranges of selected factors into the computer program, wherein at least some of the factors vary during flight of a vehicle corresponding to the aerodynamic model, wherein the computer program utilizes the ranges of selected factors and a plurality of predefined sequential non-dimensional test blocks corresponding to polynomial aerodynamic models having increasing order stored in a library and at least one predefined non-dimensional validation test block stored in a library to form a plurality of sequential scalar test blocks and at least one scalar validation test block, wherein the plurality of sequential scalar test blocks and the scalar validation test block comprise test points, each test point comprising scalar values of the selected factors to be tested;
applying the scalar validation test block to a computational fluid dynamics (CFD) program to produce validation data;
applying a first one of the sequential scalar test blocks to the CFD program to produce a first set of response data corresponding to a first aerodynamic model;
utilizing predefined prediction error criteria, the validation data, and the first set of response data to determine if the first aerodynamic model satisfies predefined pass-fail validation criteria;
if the first aerodynamic model does not satisfy the predefined pass-fail criteria, applying a second one of the sequential scalar test blocks to the CFD program to produce a second set of response data corresponding to a second aerodynamic model having a higher order than the first aerodynamic model;
utilizing predefined prediction error criteria, the validation data, and the second set of response data to determine if the second aerodynamic model satisfies the predefined pass-fail criteria; and
applying the aerodynamic model to an aerodynamic vehicle in a wind tunnel, a simulation study, a real-time simulation, or a design process.

16. The method of claim 15, including:
after determining if the first aerodynamic model satisfies predefined pass-fail criteria, splitting at least one range of the selected factors into at least two sub-ranges;
utilizing the computer program to form a plurality of sequential scalar test blocks based on at least one of the two sub-ranges.

17. The method of claim 15, wherein:
the library comprises at least four predefined sequential non-scalar test blocks; and including:
utilizing the computer program to form at least four sequential scalar test blocks.

18. The method of claim 17, wherein:
at least one predefined sequential non-scalar test block comprises a face-centered central composite design;
at least one predefined sequential non-scalar test block comprises a nested face-centered design in two-factor space.

19. The method of claim 15, wherein:
the predefined sequential non-dimensional test blocks have a scaled non-dimensional form that permits adaption of factor ranges to new test regions.

20. The method of claim 19, wherein:
the library includes a plurality of sets of sequential non-dimensional test blocks, wherein each set of sequential non-dimensional test blocks is designed for a specific number of factors, and wherein at least one set of sequential non-dimensional test blocks is configured to accommodate Lift+Cruise (L+C) vehicles, rotorcraft, or other aerodynamic vehicle.

* * * * *